United States Patent
Hong et al.

(10) Patent No.: US 10,813,028 B2
(45) Date of Patent: Oct. 20, 2020

(54) METHOD FOR PERFORMING MOBILITY PROCESS OF NB-IOT TERMINAL, AND APPARATUS THEREFOR

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/319,043

(22) PCT Filed: Jul. 20, 2017

(86) PCT No.: PCT/KR2017/007831
§ 371 (c)(1),
(2) Date: Jan. 18, 2019

(87) PCT Pub. No.: WO2018/016895
PCT Pub. Date: Jan. 25, 2018

(65) Prior Publication Data
US 2019/0357109 A1    Nov. 21, 2019

(30) Foreign Application Priority Data

Jul. 21, 2016 (KR) .................. 10-2016-0092742
Jul. 21, 2016 (KR) .................. 10-2016-0092771
Jul. 20, 2017 (KR) .................. 10-2017-0091825

(51) Int. Cl.
*H04W 36/30* (2009.01)
*H04W 76/19* (2018.01)
(Continued)

(52) U.S. Cl.
CPC .......... *H04W 36/305* (2018.08); *H04W 4/80* (2018.02); *H04W 8/08* (2013.01); *H04W 8/24* (2013.01);
(Continued)

(58) Field of Classification Search
CPC .......... H04W 36/305; H04W 36/0079; H04W 36/0033; H04W 36/08; H04W 36/36;
(Continued)

(56) References Cited

U.S. PATENT DOCUMENTS 9,258,839 B2 * 2/2016 Rayavarapu .......... H04W 76/19
2010/0278037 A1 * 11/2010 Jen ....................... H04W 76/19
370/216

(Continued)

OTHER PUBLICATIONS

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 14)", 3GPP TS 23.401 V14.0.0, Jun. 2016, pp. 1-374.
(Continued)

*Primary Examiner* — Curtis A Alia
(74) *Attorney, Agent, or Firm* — IP Legal Services, LLC

(57) ABSTRACT

Provided are a method and an apparatus for a NarrowBand-Internet of Things (NB-IoT) terminal to perform a mobility process. The method may include: transmitting an RRC connection re-establishment request message to a base station when a pre-set event occurs; receiving an RRC connection re-establishment message from the base station; and resuming a signaling radio bearer on the basis of the RRC connection re-establishment message.

15 Claims, 6 Drawing Sheets

(51) Int. Cl.
| | |
|---|---|
| H04W 4/80 | (2018.01) |
| H04W 76/27 | (2018.01) |
| H04W 36/00 | (2009.01) |
| H04W 8/08 | (2009.01) |
| H04W 8/24 | (2009.01) |
| H04W 8/26 | (2009.01) |
| H04W 36/08 | (2009.01) |

(52) U.S. Cl.
CPC ......... *H04W 8/26* (2013.01); *H04W 36/0033* (2013.01); *H04W 36/0079* (2018.08); *H04W 36/08* (2013.01); *H04W 76/19* (2018.02); *H04W 76/27* (2018.02)

(58) Field of Classification Search
CPC ....... H04W 76/19; H04W 76/27; H04W 4/70; H04W 4/80; H04W 8/08; H04W 8/24; H04W 8/26; Y02D 70/10; Y02D 70/12; Y02D 70/126
See application file for complete search history.

(56) References Cited

U.S. PATENT DOCUMENTS

| | | |
|---|---|---|
| 2012/0182896 A1 | 7/2012 | Jang et al. |
| 2012/0184281 A1 | 7/2012 | Kim et al. |
| 2012/0207112 A1 | 8/2012 | Kim et al. |
| 2012/0207130 A1 | 8/2012 | Jang et al. |
| 2012/0213107 A1 | 8/2012 | Jang et al. |
| 2012/0213129 A1 | 8/2012 | Jang et al. |
| 2012/0213137 A1 | 8/2012 | Jeong et al. |
| 2012/0213172 A1 | 8/2012 | Kim et al. |
| 2012/0213207 A1 | 8/2012 | Jang et al. |
| 2012/0214537 A1 | 8/2012 | Kim et al. |
| 2012/0257510 A1 | 10/2012 | Jeong et al. |
| 2012/0257559 A1 | 10/2012 | Kim et al. |
| 2012/0257562 A1 | 10/2012 | Kim et al. |
| 2012/0257569 A1 | 10/2012 | Jang et al. |
| 2012/0257570 A1 | 10/2012 | Jang et al. |
| 2012/0257601 A1 | 10/2012 | Kim et al. |
| 2012/0258750 A1 | 10/2012 | Kim et al. |
| 2013/0039232 A1 | 2/2013 | Kim et al. |
| 2013/0040597 A1 | 2/2013 | Jang et al. |
| 2013/0044670 A1 | 2/2013 | Jang et al. |
| 2013/0044708 A1 | 2/2013 | Kim et al. |
| 2013/0053103 A1 | 2/2013 | Kim et al. |
| 2013/0089029 A1 | 4/2013 | Jang et al. |
| 2013/0143610 A1 | 6/2013 | Jeong et al. |
| 2013/0201960 A1 | 8/2013 | Kim et al. |
| 2013/0203418 A1 | 8/2013 | Jang et al. |
| 2013/0235780 A1 | 9/2013 | Kim et al. |
| 2013/0286883 A1 | 10/2013 | Kim et al. |
| 2014/0016559 A1 | 1/2014 | Jang et al. |
| 2014/0023030 A1 | 1/2014 | Jeong et al. |
| 2014/0023032 A1 | 1/2014 | Kim et al. |
| 2014/0023055 A1 | 1/2014 | Jeong et al. |
| 2014/0029563 A1 | 1/2014 | Kim et al. |
| 2014/0036685 A1 | 2/2014 | Kim et al. |
| 2014/0092812 A1 | 4/2014 | Jang et al. |
| 2014/0161111 A1 | 6/2014 | Kim et al. |
| 2014/0179320 A1 | 6/2014 | Jang et al. |
| 2014/0211685 A1 | 7/2014 | Kim et al. |
| 2014/0211742 A1 | 7/2014 | Kim et al. |
| 2014/0226613 A1 | 8/2014 | Kim et al. |
| 2014/0233452 A1 | 8/2014 | Kim et al. |
| 2014/0233524 A1 | 8/2014 | Jang et al. |
| 2014/0241324 A1 | 8/2014 | Jang et al. |
| 2014/0286240 A1 | 9/2014 | Kim et al. |
| 2014/0287694 A1 | 9/2014 | Kim et al. |
| 2014/0287726 A1 | 9/2014 | Jang et al. |
| 2014/0295820 A1 | 10/2014 | Kim et al. |
| 2014/0317456 A1 | 10/2014 | Kim et al. |
| 2014/0334371 A1 | 11/2014 | Kim et al. |
| 2014/0341011 A1 | 11/2014 | Jeong et al. |
| 2014/0341059 A1 | 11/2014 | Jang et al. |
| 2014/0348050 A1 | 11/2014 | Kim et al. |
| 2014/0370905 A1 | 12/2014 | Kim et al. |
| 2014/0378114 A1 | 12/2014 | Lim et al. |
| 2015/0003312 A1 | 1/2015 | Jeong et al. |
| 2015/0003385 A1 | 1/2015 | Kim et al. |
| 2015/0004924 A1 | 1/2015 | Kim et al. |
| 2015/0036635 A1 | 2/2015 | Jang et al. |
| 2015/0038158 A1 | 2/2015 | Kim et al. |
| 2015/0043418 A1 | 2/2015 | Jang et al. |
| 2015/0043505 A1 | 2/2015 | Kim et al. |
| 2015/0045025 A1 | 2/2015 | Lim et al. |
| 2015/0063305 A1 | 3/2015 | Kim et al. |
| 2015/0078286 A1 | 3/2015 | Kim et al. |
| 2015/0085842 A1 | 3/2015 | Jang et al. |
| 2015/0087296 A1 | 3/2015 | Kim et al. |
| 2015/0087313 A1* | 3/2015 | Kim ................ H04W 8/08 455/437 |
| 2015/0099501 A1 | 4/2015 | Kim et al. |
| 2015/0117286 A1 | 4/2015 | Kim et al. |
| 2015/0117287 A1 | 4/2015 | Kim et al. |
| 2015/0124766 A1 | 5/2015 | Jang et al. |
| 2015/0124767 A1 | 5/2015 | Jang et al. |
| 2015/0124768 A1 | 5/2015 | Jang et al. |
| 2015/0124788 A1 | 5/2015 | Jang et al. |
| 2015/0124789 A1 | 5/2015 | Jang et al. |
| 2015/0126205 A1 | 5/2015 | Kim et al. |
| 2015/0131635 A1 | 5/2015 | Jang et al. |
| 2015/0133181 A1 | 5/2015 | Kim et al. |
| 2015/0134837 A1 | 5/2015 | Jeong et al. |
| 2015/0134838 A1 | 5/2015 | Jeong et al. |
| 2015/0163745 A1 | 6/2015 | Kim et al. |
| 2015/0173030 A1 | 6/2015 | Kim et al. |
| 2015/0173031 A1 | 6/2015 | Kim et al. |
| 2015/0181461 A1 | 6/2015 | Kim et al. |
| 2015/0181471 A1 | 6/2015 | Jang et al. |
| 2015/0181540 A1 | 6/2015 | Kim et al. |
| 2015/0181541 A1 | 6/2015 | Kim et al. |
| 2015/0181593 A1 | 6/2015 | Kim et al. |
| 2015/0189605 A1 | 7/2015 | Kim et al. |
| 2015/0189606 A1 | 7/2015 | Kim et al. |
| 2015/0189657 A1 | 7/2015 | Kim et al. |
| 2015/0195798 A1 | 7/2015 | Kim et al. |
| 2015/0195799 A1 | 7/2015 | Kim et al. |
| 2015/0201395 A1 | 7/2015 | Jeong |
| 2015/0215897 A1 | 7/2015 | Jang |
| 2015/0230253 A1 | 8/2015 | Jang et al. |
| 2015/0271740 A1 | 9/2015 | Jang et al. |
| 2015/0271796 A1 | 9/2015 | Jang et al. |
| 2015/0351134 A1 | 12/2015 | Kim et al. |
| 2015/0382247 A1 | 12/2015 | Jang et al. |
| 2015/0382248 A1 | 12/2015 | Jang et al. |
| 2015/0382249 A1 | 12/2015 | Jang et al. |
| 2015/0382256 A1 | 12/2015 | Jang et al. |
| 2015/0382257 A1 | 12/2015 | Jang et al. |
| 2016/0014672 A1 | 1/2016 | Jang et al. |
| 2016/0014673 A1 | 1/2016 | Jang et al. |
| 2016/0014721 A1 | 1/2016 | Kim et al. |
| 2016/0021628 A1 | 1/2016 | Jang et al. |
| 2016/0021629 A1 | 1/2016 | Jang et al. |
| 2016/0021630 A1 | 1/2016 | Jang et al. |
| 2016/0029207 A1 | 1/2016 | Kim et al. |
| 2016/0029208 A1 | 1/2016 | Kim et al. |
| 2016/0029209 A1 | 1/2016 | Kim et al. |
| 2016/0029309 A1 | 1/2016 | Kim et al. |
| 2016/0029310 A1 | 1/2016 | Kim et al. |
| 2016/0029317 A1 | 1/2016 | Kim et al. |
| 2016/0029414 A1 | 1/2016 | Kim et al. |
| 2016/0037313 A1 | 2/2016 | Jeong et al. |
| 2016/0037451 A1 | 2/2016 | Kim et al. |
| 2016/0037452 A1 | 2/2016 | Kim et al. |
| 2016/0050713 A1 | 2/2016 | Kim et al. |
| 2016/0066229 A1 | 3/2016 | Jang et al. |
| 2016/0066312 A1 | 3/2016 | Centonza et al. |
| 2016/0119875 A1 | 4/2016 | Kim et al. |
| 2016/0198496 A1 | 7/2016 | Jeong et al. |
| 2016/0286528 A1 | 9/2016 | Kim et al. |
| 2016/0353365 A1 | 12/2016 | Jang et al. |
| 2016/0360479 A1 | 12/2016 | Kim et al. |
| 2016/0366625 A1 | 12/2016 | Kim et al. |

(56) References Cited

U.S. PATENT DOCUMENTS

| | | |
|---|---|---|
| 2017/0006587 A1 | 1/2017 | Kim et al. |
| 2017/0048053 A1 | 2/2017 | Kim et al. |
| 2017/0048835 A1 | 2/2017 | Kim et al. |
| 2017/0064626 A1 | 3/2017 | Jeong et al. |
| 2017/0070360 A1 | 3/2017 | Kim et al. |
| 2017/0150447 A1 | 5/2017 | Kim et al. |
| 2017/0150530 A1 | 5/2017 | Kim et al. |
| 2017/0164312 A1 | 6/2017 | Jang et al. |
| 2017/0208556 A1 | 7/2017 | Kim et al. |
| 2017/0223746 A1 | 8/2017 | Jeong et al. |
| 2017/0231028 A1 | 8/2017 | Kim et al. |
| 2017/0257792 A1 | 9/2017 | Kim et al. |
| 2017/0257903 A1 | 9/2017 | Kim et al. |
| 2017/0303334 A1 | 10/2017 | Kim et al. |
| 2017/0310497 A1 | 10/2017 | Kim et al. |
| 2017/0318548 A1 | 11/2017 | Kim et al. |
| 2017/0318606 A1* | 11/2017 | Lee .................. H04L 67/12 |
| 2018/0007589 A1 | 1/2018 | Jang et al. |
| 2018/0077734 A1 | 3/2018 | Kim et al. |
| 2018/0242217 A1 | 8/2018 | Kim et al. |
| 2018/0302902 A1 | 10/2018 | Jeong et al. |
| 2018/0310259 A1 | 10/2018 | Kim et al. |
| 2018/0317277 A1 | 11/2018 | Kim et al. |
| 2018/0352418 A1 | 12/2018 | Lim et al. |
| 2018/0359064 A1 | 12/2018 | Kim et al. |
| 2019/0007828 A1 | 1/2019 | Kim et al. |

OTHER PUBLICATIONS

LG Electronics, "Clarification of new active flag handling for CP CIoT EPS Optimizaition", S2-163514, SA WG2 Meeting #116, Jul. 11-15, 2016, Vienna, Austria, pp. 1-18.

NEC, "Key Issue CN overload protection from data transfer via control plane CIoT EPS optimizations—solution 1", S2-163484, SA WG2 Meeting #116, Jul. 11-15, 2016, Vienna, Austria, pp. 1-3.

* cited by examiner

METHOD FOR PERFORMING MOBILITY PROCESS OF NB-IOT TERMINAL, AND APPARATUS THEREFOR

CROSS REFERENCE TO RELATED APPLICATIONS

This application is a National Stage Patent Application of PCT International Patent Application No. PCT/KR2017/007831 (filed on Jul. 20, 2017) under 35 U.S.C. § 371, which claims priority to Korean Patent Application Nos. 10-2016-0092771 (filed on Jul. 21, 2016), 10-2016-0092742 (filed on Jul. 21, 2016) and 10-2017-0091825 (filed on Jul. 20, 2017), the teachings of which are incorporated herein in their entireties by reference.

TECHNICAL FIELD

The present disclosure relates to a method and an apparatus for handling mobility of a NarrowBand-Internet of Things (NB-IoT) terminal, and more specifically, to a method and an apparatus for maintaining service continuity for an NB-IoT terminal.

BACKGROUND ART

Research on NB-IoT technology has been conducted by a related international standard organization. The purpose of the relevant research is to research technology of IoT terminals for improving indoor coverage improved by utilizing a cellular network, for supporting large-scale low-speed terminals, for low-latency sensitivity, for ultra-low terminal cost, for low power consumption, and for an optimized network architecture.

Such an IoT terminal essentially requires low unit price and low power consumption for long-term use. Accordingly, an IoT terminal has many differences from a typical terminal employing existing LTE technology in terms of supported functionality.

For example, unlike a typical LTE terminal, an IoT terminal is not supported by handover technology. Also, an IoT terminal does not perform an operation of measuring a channel state of a channel connected thereto and periodically delivering the same to a base station.

Accordingly, even when an IoT terminal moves and leaves the coverage of a base station or when a radio state is seriously degraded, a base station does not understand the current status. When detecting a radio link failure in an existing cell, an IoT terminal has to transition to an idle state and performs a reconnection.

When such a procedure takes place, an IoT terminal is problematic in that the same cannot provide a service until a channel state becomes better or the same transitions to an idle state and completes execution of a reconnection procedure. That is, a problem may arise in that an IoT terminal does not perform a mobility handling procedure and thus a service interruption occurs.

In order to solve the above-mentioned problems, there is a need to develop technology which satisfies low power requirements and supports mobility handling of an IoT terminal without a service interruption.

DETAILED DESCRIPTION OF THE INVENTION

Technical Problem

An aspect of the present disclosure devised by considering the above-described background is to propose a mobility handling method for preventing a service interruption for an NB-IoT terminal having low unit price and low power requirements, and an apparatus therefor.

Also, another aspect of the present disclosure is to propose a method and an apparatus for quickly recovering from the radio link failure and for transmitting or receiving data while preventing unnecessary power consumption.

Technical Solution

In order to solve the above-mentioned technical problem, in accordance with an aspect of the present disclosure, there is provided a method for handling mobility by an NB-IoT terminal. The method includes: transmitting a Radio Resource Control (RRC) connection re-establishment request message to a base station when a predetermined event occurs; receiving an RRC connection re-establishment message from the base station; and resuming a signaling radio bearer on the basis of the RRC connection re-establishment message.

Also, in accordance with another aspect of the present disclosure, there is provided a method for handling mobility of an NB-IoT terminal by a base station. The method includes: receiving an RRC connection re-establishment request message from an NB-IoT terminal; checking a terminal context of the NB-IoT terminal on the basis of the RRC connection re-establishment request message; and transmitting an RRC connection re-establishment message for resuming a signaling radio bearer of the NB-IoT terminal.

Also, in accordance with still another aspect of the present disclosure, there is provided an NB-IoT terminal for handling mobility. The NB-IoT terminal includes: a transmitter configured to transmit an RRC connection re-establishment request message to a base station when a predetermined event occurs; a receiver configured to receive an RRC connection re-establishment message from the base station; and a controller configured to resume a signaling radio bearer on the basis of the RRC connection re-establishment message.

Further, in accordance with yet another aspect of the present disclosure, there is provided a base station for handling mobility of an NB-IoT terminal. The base station includes: a receiver configured to receive an RRC connection re-establishment request message from an NB-IoT terminal; a controller configured to check a terminal context of the NB-IoT terminal on the basis of the RRC connection re-establishment request message; and a transmitter configured to transmit an RRC connection re-establishment message for resuming a signaling radio bearer of the NB-IoT terminal.

Advantageous Effects

The above-described present disclosure is advantageous in that an NB-IoT terminal having low unit price and low power requirements can quickly resume a service even when a service interruption occurs according to the movement of the NB-IoT terminal, the degradation of a communication channel state, and the like.

Also, the present disclosure is advantageous in that an NB-IoT terminal can support mobility and can provide a continuous and stable service.

MODE FOR CARRYING OUT THE INVENTION

Figure 1:
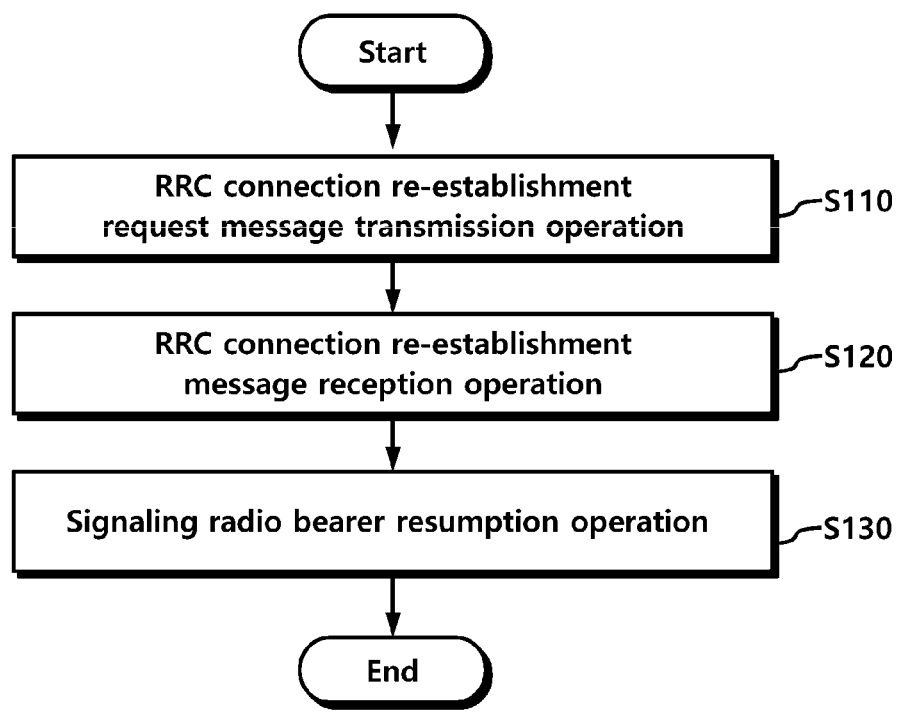
FIG. 1 is a flowchart illustrating an operation of a terminal according to an embodiment.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present specifications, an machine type communication (MTC) terminal may refer to a terminal that supports low cost (or low complexity), a terminal that supports coverage enhancement, or the like. In the present specifications, the MTC terminal may refer to a terminal that supports low cost (or low complexity) and coverage enhancement, or the like. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined 3GPP Release 13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release 13 low cost (or low complexity) UE category/type.

The wireless communication system may be widely installed to provide various communication services, such as a voice service, a packet data service, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in wideband code division multiple access (WCDMA), long term evolution (LTE), high speed packet access (HSPA), and the like, and an MS (Mobile station), a UT (User Terminal), an SS (Subscriber Station), a wireless device, and the like in global systems for mobile communication (GSM).

A base station or a cell may generally refer to a station where performs communication with a User Equipment (UE). The base station or the cell may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell. The base station may be construed in two ways: i) the base station may be a device that provides a megacell, a macrocell, a microcell, a picocell, a femtocell, and a small cell in association with a wireless area; or ii) the base station may indicate a wireless area itself. In i), a base station may be all devices that interact with one another and are controlled by an identical entity to provide a predetermined wireless area or all devices that cooperate with each other to provide a predetermined wireless area. Based on a configuration type of a wireless area, the base station may be an eNB, an RRH, an antenna, an RU, a Low Power Node (LPN), a point, a transmission/reception point, a transmission point, and a reception point. In ii), a base station may be a wireless area itself that enables a terminal to receive signals from or transmit a signal to the other terminal or a neighboring base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the present specification, the user equipment and the base station are used as two inclusive transceiving subjects to embody the technology and technical concepts described in the specifications. However, embodiments of the present disclosure may not be limited to a predetermined term or word. In the present specification, Uplink (UL) refers to a scheme for a UE to transmit data to and receive data from a base station, and Downlink (DL) refers to a scheme for a base station to transmit data to and receive data from a UE.

Varied multiple access schemes may be unrestrictedly applied to the wireless communication system. Various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like may be used. Embodiments of the present disclosure may be applicable to resource allocation in an asynchronous wireless communication scheme that is advanced through GSM, WCDMA, and HSPA, to be LTE and LTE-advanced The embodiments of the present disclosure may be applicable to resource allocation in a synchronous wireless communication scheme that is advanced through CDMA and CDMA-2000, to be UMB. The embodiments of the present disclosure may not be limited to a specific wireless communication field and may include all technical fields in which the technical idea of the present disclosure is applicable.

Uplink transmission and downlink transmission may be performed based on i) a TDD (Time Division Duplex) scheme that performs transmission based on different times or ii) an FDD (Frequency Division Duplex) scheme that performs transmission based on different frequencies.

Further, a standard related to LTE and LTE-A may define an uplink and a downlink to be configured based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH (Enhanced Physical Downlink Control CHannel), and the like. The uplink and the downlink may transmit data through a data channel, such as a PDSCH (Physical Downlink Shared CHannel), a PUSCH (Physical Uplink Shared CHannel), and the like.

Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be i) a base station or ii) a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In a downlink, a transmitter may be a part of a multiple transmission/reception point, and a receiver may be a part of a terminal. In an uplink, a transmitter may be a part of a terminal, and a receiver may be a part of a multiple transmission/reception point.

Hereinafter, signal transmission and reception through a PUCCH, a PUSCH, a PDCCH, or a PDSCH may be described through the expression, "a PUCCH, a PUSCH, a PDCCH, or a PDSCH is transmitted or received".

In addition, hereinafter, the expression "a PDCCH is transmitted or received, or a signal is transmitted or received through a PDCCH" includes the same meaning that "an EPDCCH is transmitted or received, or a signal is transmitted or received through an EPDCCH".

That is, a physical downlink control channel used herein may indicate a PDCCH or an EPDCCH, and the physical downlink control channel may indicate a meaning including both a PDCCH and an EPDCCH.

In addition, an EPDCCH defined according to an embodiment of the present disclosure may be applied to embodiments described using a PDCCH and to embodiments described using an EPDCCH.

In the following description, higher layer signaling includes a Radio Resource Control (RRC) signaling that transmits RRC information including an RRC parameter.

An eNB executes downlink transmission to terminals. The eNB may transmit a Physical Downlink Shared Channel (PDSCH) which is a primary physical channel for unicast transmission, and the eNB may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

Research on NB-IoT technology has been conducted in 3GPP Release-13. The purpose of the relevant research is to specify wireless access for cellular IoT, and the specification includes improved indoor coverage, support for large-scale low-speed terminals, low-latency sensitivity, ultra-low terminal cost, low power consumption, and an optimized network architecture. Rel-13 NB-IoT has employed only essential functions required to enable a 3GPP system in order to rapidly penetrate into a low-cost IoT market. Accordingly, multiple functions of a typical LTE terminal that provides a mobile broadband service are not implemented to Rel-13 NB-IoT. For example, a handover provided to a typical connected mode terminal is not implemented to a Rel-13 NB-IoT terminal. In order to provide a handover to a connected terminal, a base station has to configure measurement and reporting for a terminal, and when the terminal reaches a particular criterion on the basis of the configured measurement and reporting therefor, the terminal has to perform reporting to the base station. When a source base station determines a handover, the source base station instructs the terminal to hand over to a target cell through signaling with a target base station. These procedures may cause power consumption of the terminal and may become factors which cause complex operations of the terminal. Therefore, Rel-13 NB-IoT does not support a handover-related operation in a connected mode. Accordingly, even when a connected NB-IoT terminal leaves the coverage according to the movement thereof or a radio state is seriously degraded, a base station does not understand the current status. Thereafter, when detecting a radio link failure in an existing cell, the terminal transitions to an idle state and performs a reconnection.

As described above, in the related art, a handover provided to a typical connected terminal is not provided to an NB-IoT terminal. Accordingly, even when a connected NB-IoT terminal moves and leaves the coverage or a radio state is seriously degraded, a base station does not understand the current status. When detecting a radio link failure, the terminal transitions to an idle state and performs a reconnection.

The purpose of the present disclosure devised to solve the above-mentioned problem is to provide a method and an apparatus for improving service continuity for a connected NB-IoT terminal.

The embodiments of the present disclosure can be applied to an NB-IoT terminal. Also, the embodiments can be applied to a typical terminal which provides the corresponding capability. For convenience of description, in the present specification, a description of wireless access technology is made on the basis of LTE technology, but the embodiments of the present disclosure are not only be applied to a terminal using LTE wireless access technology but also are applied to a terminal using next-generation (e.g., 5G new RAT) wireless access technology.

Also, hereinafter, according to the need, an NB-IoT terminal may be expressed as a terminal.

For an NB-IoT terminal, which solution is to be used for Cellular IoT (CIoT) signaling reduction optimization is configured through signaling between the terminal and a Mobility Management Entity (MME). While Access Stratum (AS) security is not activated, a Packet Data Convergence Protocol (PDCP) is not used. A control plane Cellular IoT Evolved Packet System (CIoT EPS) optimization and a user plane CIoT EPS optimization exist as solutions for CIoT signaling reduction optimization.

An RRC connection configured for only a control plane CIoT EPS optimization has the following characteristics.

An uplink Non-Access Stratum (NAS) signaling message or an uplink NAS message which transports data may be transmitted in an uplink RRC container message. A downlink NAS signaling message or a downlink NAS data may be transmitted in a downlink RRC container message.

An RRC connection reconfiguration and an RRC connection re-establishment are not supported.

A data radio bearer is not used.

AS security is not used.

An RRC connection established for a user plane CIoT EPS optimization has the following characteristics.

An RRC connection suspend procedure is used when an RRC connection is released. A base station may request a terminal to maintain AS context including a terminal capability in an RRC idle state.

During transition from RRC idle to RRC connected, an RRC connection resume procedure is used. Information pre-stored in a terminal and a base station is used to resume an RRC connection. An NB-IoT terminal provides, into a message to be resumed, a ResumeID used to access the stored information required to resume an RRC connection.

During suspension-resumption, security continues. For an RRC re-establishment procedure and an RRC resume procedure, a short Message Authentication Code (MAC)-I is reused as an authentication token. A base station provides NCC. Then, a terminal resets COUNT.

An NB-IoT terminal, which supports both a control plane CIoT EPS optimization and a user plane CIoT EPS optimization, may refer to characteristics of a terminal supporting a user plane CIoT EPS optimization.

As described above, in the present specification, a terminal or an NB-IoT terminal may signify a terminal supporting the above-described control plane CIoT EPS optimization or the above-described user plane CIoT EPS optimization.

In the related art, support for mobility of a connected terminal may include a series of the following procedures. The procedures include: configuration of measurement and reporting for a terminal by a source base station; measurement of a terminal; reporting of a result of the measurement to a base station upon reaching a particular criterion; determination of a handover by a source base station; signaling between a source base station and a target base station; instructing a terminal to hand over to a target cell; and the like. When measurement and reporting are configured for a terminal having the characteristics of infrequent data transmission, low-latency sensitivity, low cost, and low power consumption, power consumption may become larger than that of a conventional NB-IoT terminal.

Accordingly, in the present disclosure, specific operations of a terminal and a base station for supporting mobility handling while reducing power consumption of an NB-IoT terminal will be described focusing on embodiments thereof.

FIG. 1 is a flowchart illustrating an operation of a terminal according to an embodiment.

An NB-IoT terminal according to an embodiment may perform: an operation of transmitting an RRC connection re-establishment request message to a base station when a predetermined event occurs; an operation of receiving an RRC connection re-establishment message from the base station; and an operation of resuming a signaling radio bearer on the basis of the RRC connection re-establishment message.

Referring to FIG. 1, in operation S110, the NB-IoT terminal may perform an operation of transmitting an RRC connection re-establishment request message to a base station when a predetermined event occurs. For example, the NB-IoT terminal may determine whether a predetermined event condition is satisfied. When the relevant event condition is satisfied, the NB-IoT terminal may transmit an RRC connection re-establishment request message to the base station. For example, a predetermined event may signify one of detection of a radio link failure by the NB-IoT terminal and detection of a handover failure by the same. As another example, a predetermined event may be configured as multiple conditions. For example, a predetermined event is determined to be satisfied i) when the NB-IoT terminal is configured to support a control plane CIoT EPS optimization, ii) when the NB-IoT terminal receives indication information which permits the NB-IoT terminal to re-establish an RRC connection and is transmitted by a base station in a state where AS security is not activated, and iii) when a radio link failure or a handover failure is detected. predetermined event.

An RRC connection re-establishment request message may include a terminal identifier information which is set to an SAE-Temporary Mobile Subscriber Identity (S-TMSI). Through the RRC connection re-establishment request message, the base station may inquire about a terminal context by using the terminal identifier information received from the NB-IoT terminal. For example, a terminal context may be checked using an MME or the contents stored in the base station. Alternatively, when a base station which receives an RRC connection re-establishment request message is a target base station, the target base station may check a terminal context by inquiring of a source base station about the terminal context.

Also, an RRC connection re-establishment request message may include a message authentication code. For example, a message authentication code may include NAS Message Authentication Code (MAC) information for checking message authentication of a terminal by using an MME.

That is, when a predetermined event condition is satisfied, the NB-IoT terminal may transmit an RRC connection re-establishment request message to the base station to prevent a service interruption while resumption of a signaling radio bearer of the NB-IoT terminal minimizes power consumption.

In operation S120, the NB-IoT terminal may perform an operation of receiving an RRC connection re-establishment message from the base station. For example, an RRC connection re-establishment message may include message authentication code information. As described above, a message authentication code may include NAS MAC information. An RRC connection re-establishment message may include information for controlling to resume a signaling radio bearer of the NB-IoT terminal.

In operation S130, the NB-IoT terminal may perform an operation of resuming a signaling radio bearer on the basis of the RRC connection re-establishment message. The NB-IoT terminal having received the RRC connection re-establishment message from the base station may resume a signaling radio bearer. As described above, the NB-IoT terminal supporting a control plane CIoT EPS optimization may transmit or receive a little amount of data through the signaling radio bearer. Accordingly, the NB-IoT terminal may resume a signaling radio bearer, thereby minimizing a service interruption and maintaining data communication.

The above-described NB-IoT terminal may be a terminal configured to support a control plane CIoT EPS optimization. Also, the NB-IoT terminal may signify a terminal which does not configure a data radio bearer and transmits or receives data in a state where AS security is not activated. Further, the above-described base station may be a source base station or a target base station.

Figure 2:
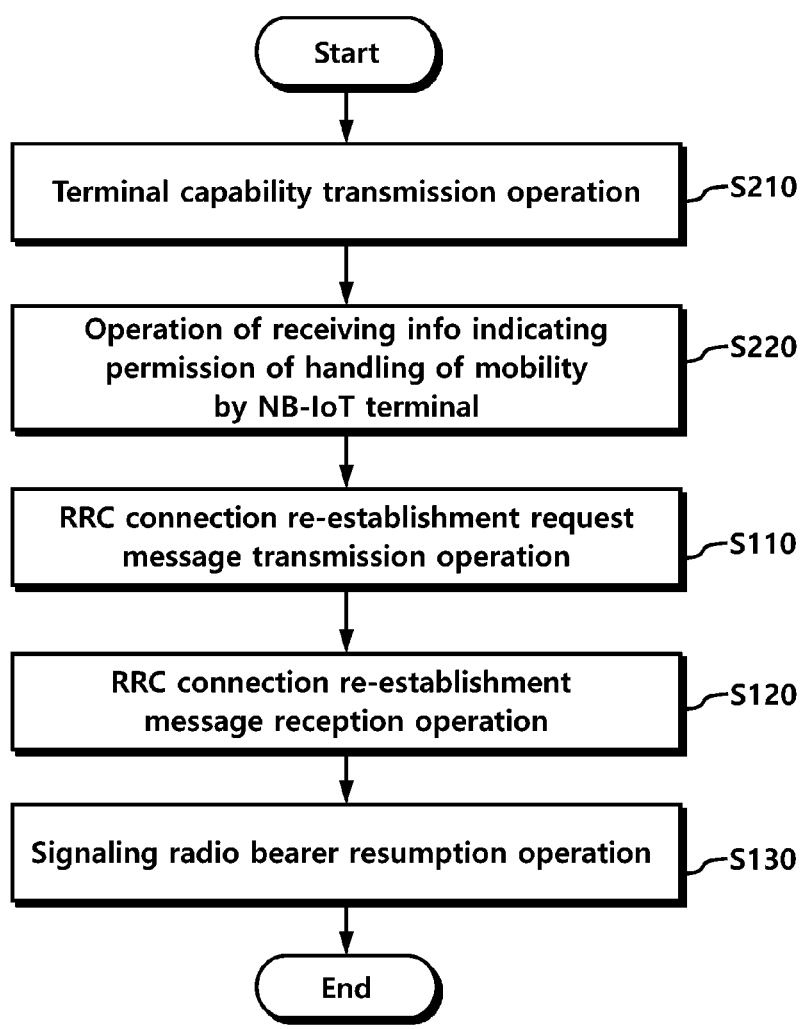
FIG. 2 is a flowchart illustrating an operation of a terminal according to another embodiment.

FIG. 2 is a flowchart illustrating an operation of a terminal according to another embodiment.

Referring to FIG. 2, before operation S110 of transmitting an RRC connection re-establishment request message, in operation S210, an NB-IoT terminal may further perform an operation of transmitting a terminal capability indicating support for a control plane CIoT EPS optimization.

For example, the NB-IoT terminal may pre-transmit, to a base station, information indicating that the NB-IoT terminal is capable of supporting a control plane CIoT EPS optimization operation, thereby enabling the base station to recognize that the NB-IoT terminal is capable of supporting the same. Terminal capability information may be transmitted during an initial setup of the NB-IoT terminal and the base station.

Alternatively, in operation S220, the NB-IoT terminal may further perform an operation of receiving information indicating permission of handling of mobility by the NB-IoT terminal through system information from the base station. For example, the base station may transmit, through an RRC connection re-establishment, information indicating permission of an operation of resuming a signaling radio bearer. The NB-IoT terminal may check information indicating permission of an operation of resuming a signaling radio bearer, wherein the information is received through system information, and may transmit an RRC connection re-establishment request message to the base station, thereby performing the operations described with reference to FIG. 1.

The order of operations S210 and S220 may be changed, or one operation among operations S210 and S220 may be omitted.

Figure 3:
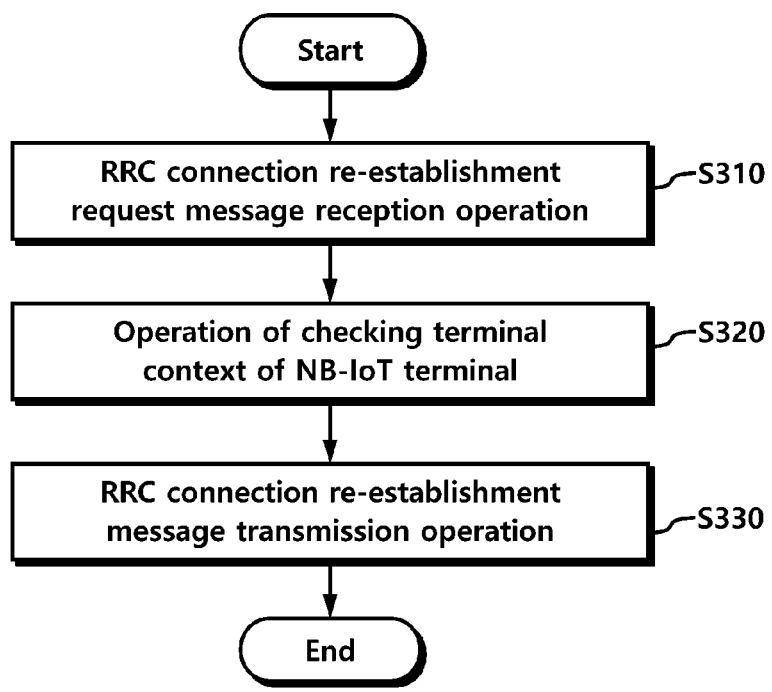
FIG. 3 is a flowchart illustrating an operation of a base station according to an embodiment.

FIG. 3 is a flowchart illustrating an operation of a base station according to an embodiment.

Referring to FIG. 3, in handling mobility of an NB-IoT terminal, in operation S310, the base station may perform an operation of receiving an RRC connection re-establishment request message from an NB-IoT terminal. For example, an RRC connection re-establishment request message may be received when the NB-IoT terminal detects a radio link failure and a handover failure. Alternatively, an RRC connection re-establishment request message may be received when multiple conditions are satisfied, wherein the multiple conditions are described as follows: i) when the NB-IoT terminal is configured to support a control plane CIoT EPS optimization, ii) when the NB-IoT terminal receives indication information which permits the NB-IoT terminal to re-establish an RRC connection and is transmitted by the base station in a state where AS security is not activated, and iii) when a radio link failure or a handover failure occurs is detected.

An RRC connection re-establishment request message may include terminal identifier information which is set to an S-TMSI. Also, an RRC connection re-establishment request message may include a message authentication code. For example, a message authentication code may include NAS MAC information for checking message authentication of a terminal by using an MME.

In operation S320, the base station may perform an operation of checking a terminal context of the NB-IoT terminal on the basis of the RRC connection re-establishment request message. For example, the base station may inquire about a terminal context by using terminal identifier information included in the RRC connection re-establishment request message. For example, a terminal context may check message authentication of a terminal by using an MME or may be checked using the contents stored in the base station. Alternatively, when a base station having received an RRC connection re-establishment request message is a target base station, the target base station may check message authentication of a terminal by inquiring of a source base station about a terminal context.

In operation S330, the base station may perform an operation of transmitting an RRC connection re-establishment message for resuming a signaling radio bearer of the NB-IoT terminal. An RRC connection re-establishment message may include information for controlling to resume a signaling radio bearer of the NB-IoT terminal. As described above, an NB-IoT terminal supporting a control plane CIoT EPS optimization may transmit or receive a little amount of data through a signaling radio bearer. Accordingly, the NB-IoT terminal may resume a signaling radio bearer, thereby minimizing a service interruption and maintaining data communication.

The base station may receive a terminal capability indicating support for a control plane CIoT EPS optimization. A terminal capability may be received in an initial setup procedure for the NB-IoT terminal and the base station, and the base station may check, through the terminal capability, that the NB-IoT terminal supports mobility handling (e.g., SRB resumption) through an RRC connection re-establishment operation.

Also, according to the need, the base station may transmit, through system information, information indicating that the relevant base station permits handling of mobility by the NB-IoT terminal. For example, the base station may transmit, through an RRC connection re-establishment, information indicating permission of an operation of the NB-IoT terminal for resuming a signaling radio bearer (mobility handling). The NB-IoT terminal may check information indicating permission of an operation of resuming a signaling radio bearer, wherein the information is received through system information. The NB-IoT terminal may transmit an RRC connection re-establishment request message to the base station, thereby performing the operations described with reference to FIG. 1.

The above-described NB-IoT terminal may be a terminal configured to support a control plane CIoT EPS optimization. Also, the NB-IoT terminal may signify a terminal which does not configure a data radio bearer and transmits or receives data in a state where AS security is not activated. Further, the above-described base station may be a source base station or a target base station.

Through the above-described operations, an NB-IoT terminal may not only minimize power consumption but may also quickly recover from a service interruption in a situation of a handover failure or the degradation of quality of a wireless channel. By this configuration, it is possible to support service continuity for an NB-IoT terminal.

Hereinafter, more various embodiments of supporting service continuity, including the embodiments described with reference to FIGS. 1 to 3, will be additionally described.

In order to improve service continuity, the following embodiments may be used separately or in combination.

Hereinafter, for convenience of description, an NB-IoT terminal will be expressed and described as a terminal. Furthermore, the NB-IoT terminal will be expressed as an NB-IoT terminal when it is necessary to distinguish the same from a typical LTE terminal.

First Embodiment: Method for Receiving Assistance/Indication Information from Terminal and Performing RRC Connection Suspend When a terminal is characterized by infrequent data transmission, low-latency sensitivity, low cost, and low power consumption, if the relevant terminal is connected to a network in order to transmit data and a connected state lasts for a long time even after the data transmission is finished, this situation causes power consumption of the terminal and thus may not be desired.

When a terminal is connected to a network in order to transmit data in an application/higher layer and then the data transmission is completed, the terminal may transmit assistance information on completion of data transmission to a base station through an RRC message. Alternatively, the terminal may transmit indication information indicating/suggesting an RRC connection suspend through an RRC message.

A base station may broadcast, through system information, information on whether the terminal permits transmission of the above-described assistance/indication information. Alternatively, the base station may provide, through dedicated information, information on whether the terminal permits transmission of the above-described assistance/indication information.

The above-described assistance information may include information including at least one piece of information among information expressing termination of transaction, the amount of transaction data, the next transaction time, a remaining time until the next transaction, a transaction cycle, an expected time of the next transaction, and the amount of the next transaction data. The assistance information may be transmitted to a base station.

For example, a base station having received assistance/indication information suspends an RRC connection. This configuration may include suspension of a configured radio bearer.

As another example, a base station having received assistance/indication information may store the received assistance/indication information in a terminal context.

As still another example, a terminal having received an RRC message (e.g., an RRC connection release message) including information indicating an RRC connection suspend stores the above-described assistance information.

As yet another example, a terminal having received an RRC message (e.g., an RRC connection release message) including information indicating an RRC connection suspend suspends an RRC connection. This configuration may include suspension of an established radio bearer. The terminal stores a terminal AS context.

As still yet another example, a terminal leaves an RRC-connected state.

Second Embodiment: Method for Receiving Assistance/Indication Information from MME and Performing RRC Connection Suspend When a terminal is characterized by infrequent data transmission, low-latency sensitivity, low cost, and low power consumption, if the relevant terminal is connected to a network in order to transmit data and a connected state lasts for a long time even after the data transmission is finished, this situation causes power consumption of the terminal and thus may not be desired.

For example, when a terminal is connected to a network in order to transmit data in an application/higher layer and then the data transmission is completed, the terminal may transmit assistance information on completion of data transmission to an MME through a NAS message. Alternatively, the terminal may transmit indication information indicating/suggesting an RRC connection suspend through a NAS message.

The above-described assistance information may include information including at least one piece of information among information expressing termination of transaction, the amount of transaction data, the next transaction time, a remaining time until the next transaction, a transaction cycle, an expected time of the next transaction, and the amount of the next transaction data. The assistance information may be transmitted to a base station.

As another example, an MME may maintain information on an expected behavior of a relevant terminal (expected UE behavior) on the basis of subscription information and statistical information.

As still another example, after a terminal is connected to a network in order to transmit data in an application/higher layer through SCS server/external MTC server/application server and the like, the data transmission is completed and the terminal may transmit assistance information on completion of data transmission to an MME. The above-described assistance information may include at least one piece of information among information expressing termination of transaction, the amount of transaction data, the next transaction time, a remaining time until the next transaction, a transaction cycle, an expected time of the next transaction, and the amount of the next transaction data.

The MME may transmit, to a base station, an S1 message including information indicating the suspension of an RRC connection. The MME may include, in an S1 message, the above-described assistance information together with the information indicating the suspension of an RRC connection.

For example, a base station having received assistance information suspends an RRC connection. This configuration includes suspension of a radio bearer.

As another example, a base station having received assistance information may store the received assistance information in a terminal context.

As still another example, a terminal having received an RRC message (e.g., an RRC connection release message) including information indicating an RRC connection suspend stores the above-described assistance information.

As yet another example, a terminal having received an RRC message (e.g., an RRC connection release message) including information indicating an RRC connection suspend stores a terminal AS context including the above-described assistance information.

As still yet another example, a terminal leaves an RRC-connected state.

The base station transmits, to the MME, a response message in response to the above-described S1 message including information indicating the suspension of an RRC connection.

Third Embodiment: Method for Improving and Supporting at Least One of Measurement, Reporting, and Handover Supported for Typical Terminal An NB-IoT terminal may employ at least one of mobility procedures including a measurement configuration, a reporting configuration, and a handover command according to the control of a base station similar to a typical connected terminal.

However, when the NB-IoT terminal employs mobility support procedures, including measurement, reporting, a handover, and the like, like a typical connected terminal, power consumption of the NB-IoT terminal is increased. Accordingly, it may be difficult to satisfy low power requirements of the NB-IoT terminal. In order to reduce increment in power consumption of the terminal, the base station may simplify a mobility procedure-related configuration.

For example, a measurement configuration may be simplified. The base station may configure a filtering coefficient of a measurement quantity, used to configure measurement for the NB-IoT terminal, to have a value different from a filtering coefficient of a measurement quantity for a typical terminal. In the present example, a filtering coefficient represents a value used for Layer 3 filtering in relation to a measurement value. The terminal filters a measurement value by using a formula below, before using for measurement reporting or for evaluation of reporting criteria with respect to each measurement quantity, measurement of which has been performed by the terminal.

$$F_n = (1-a) \cdot F_{n-1} + a \cdot M_n$$

In the present example, $M_n$ represents the last received measurement value from a physical layer, $F_n$ represents an updated filtered measurement value, Fn−1 represents a pre-filtered measurement value, and $a = 1/2^{(k/4)}$ where k represents a filter coefficient.

For a typical connected terminal, a sample rate is considered to be 200 ms. Accordingly, a filtering coefficient k=4 is used. That is, a=½. For an NB-IoT connected terminal, a larger sample rate is considered. Thus, a filtering coefficient having a different value (e.g., a natural number satisfying k>4) may be used.

As another example, a cell change threshold may be configured but this configuration may not be reported.

As still another example, only a particular reporting method may be used. For example, only event trigger-based reporting may be performed. An event for low power consumption for this configuration may be configured. Alternatively, when event trigger-based reporting is performed, measurement reporting may be suppressed for a predetermined time. To this end, a base station may configure a relevant value in a terminal.

The base station may generate or produce information for indicating the above-described operation in the terminal.

As yet another example, by defining an NB-IoT terminal to support a measurement configuration, a reporting configuration, or connected mode mobility, a base station may provide, to only the relevant NB-IoT terminal, support for a measurement configuration, a reporting configuration, or connected mode mobility. To this end, when an NB-IoT terminal (a terminal classified as an NB-IoT category) is capable of supporting a function of supporting a measurement configuration, a reporting configuration, or connected mode mobility, the relevant NB-IoT terminal may include, in terminal capability information, information on whether these functions are supported and may deliver the terminal capability information to the base station. For example, the NB-IoT terminal may include information on support for these functions in an RRC connection request message and may deliver the RRC connection request message to the base station. As another example, an NB-IoT terminal may include information indicating support for these functions in an RRC connection resume request message and may deliver the RRC connection resume request message to the base station. As still another example, information on whether these functions are supported may be delivered from a terminal to a base station by using a UE capability transfer procedure. As yet another example, information on whether these functions are supported may be transmitted to an MME by a terminal through NAS signaling (an attach procedure, etc.) and may be delivered to a base station through an S1 interface. The base station may transmit, to the relevant terminal, an RRC connection reconfiguration message providing a function of supporting a measurement configuration, a reporting configuration, or connected mode mobility.

Fourth Embodiment: Method for Supporting Mobility Through RRC Connection Re-Establishment Procedure The use of a general handover procedure, applied to a typical terminal, for an NB-IoT terminal becomes a significant overhead. That is, a method for causing an NB-IoT terminal to transmit, in time, measurement reporting and causing a base station to perform a handover on the basis of the measurement reporting may become a significant overhead. In order to make this situation better, the following mobility support method may be provided to a connected terminal.

For example, a base station may inform of a terminal a critical criterion for triggering cell change for the terminal. When the terminal reaches the criterion, the terminal may trigger an RRC connection re-establishment procedure.

To this end, an event for triggering cell change may be defined.

For example, an event for triggering cell change (e.g., cell change criterion) may be defined as an A3 event (neighbor becomes amount of offset better than Primary Cell (PCell)) of a typical LTE terminal.

As another example, an event for triggering cell change (e.g., cell change criterion) may be defined as an A2 event (serving becomes worse than absolute threshold) of a typical LTE terminal.

As still another example, an event for triggering cell change (e.g., cell change criterion) may be defined as an A2 event (serving becomes worse than absolute threshold) and A4 event (neighbor becomes better than absolute threshold) of a typical LTE.

As yet another example, an event for triggering cell change (e.g., cell change criterion) may be defined as a Radio Link Failure (RLF) criterion of a typical LTE terminal. On the basis of the RLF criterion, a terminal may detect a radio link failure through an RLF timer and a related parameter broadcasted by a base station through system information.

When two events are simultaneously satisfied, the terminal may trigger the above-described procedure.

The base station may recognize a terminal capable of performing the above-described operations, through terminal capability information. The base station may configure information for instructing the terminal to perform the operations. For example, the base station may use system information to indicate whether the terminal is capable of performing the above-described operations. As another example, the base station may use dedicated signaling information for indicating whether the terminal is capable of performing the above-described operations.

An RRC connection re-establishment procedure may be initiated only when AS security is activated. Accordingly, an RRC connection re-establishment procedure may be applied to i) an NB-IoT terminal supporting a user plane CIoT EPS optimization or ii) an NB-IoT terminal supporting both a control plane CIoT EPS optimization and a user plane CIoT EPS optimization. In order to support an RRC connection re-establishment procedure for an NB-IoT terminal supporting only a control plane CIoT EPS optimization, it needs to add a procedure for activating AS security or to perform message authentication when a terminal context is checked through an MME.

For example, the terminal may process an RRC connection re-establishment by performing at least one of the following operations.

When an RRC connection re-establishment procedure is initiated, the terminal stops a timer (e.g., T310 or T312) if the timer is on.

The terminal suspends all radio bearers except SRB0.

The terminal resets a MAC.

The terminal applies a default physical channel configuration.

The terminal applies a default MAC main configuration.

The terminal selects a cell.

When a suitable cell is selected, the terminal applies timealignmenttimercommon included in system information.

The terminal initiates transmission of an RRC connection re-establishment request message.

In an RRC connection re-establishment request message,

For example, a terminal identifier is set to a Cell Radio Network Temporary Identifier (C-RNTI) used by a source PCell. As another example, a terminal identifier is set to an S-TMSI.

A physical cell identifier is set to a physCellId used by a source PCell.

For example, a shortMAC-I is set to 16 least significant bits of the calculated MAC-I. As another example, when a terminal identifier is set to an S-TMSI, the terminal identifier may include a NAS MAC.

A cause of re-setting (reestablishmentCause) is set as cell change (or mobility support or a handover).

The base station transmits an RRC connection re-establishment message to the terminal.

The terminal receives an RRC connection re-establishment message and performs operations as follows.

The terminal re-establishes a PDCP for Signaling Radio Bearer 1 (SRB1).

The terminal re-establishes Radio Link Control (RLC) for SRB1.

The terminal performs a radio resource configuration according to the received radio resource configuration dedicated information.

The terminal resumes SRB1.

The terminal updates a $K_{eNB}$ key on the basis of a $K_{ASME}$ key, with which a current $K_{eNB}$ is associated, by using an indicated NCC value within an RRC connection re-establishment message.

The terminal derives $K_{RRCint}$ associated with a pre-configured integrity algorithm.

The terminal derives $K_{RRCint}$ and $K_{UPenc}$ associated with a pre-configured ciphering algorithm.

The terminal configures integrity protection to be activated in a lower layer by using a pre-configured algorithm and $K_{RRCint}$.

The terminal configures a ciphering algorithm, $K_{RRCint}$, and $K_{UPenc}$ to be applied to a lower layer.

The terminal transmits an RRC connection re-establishment complete message to the base station.

The terminal receives an RRC connection re-establishment message and performs operations as follows. That is, when receiving an RRC connection re-establishment request message having reestablishmentCause information set to cell change, the base station may reconfigure all Data Radio Bearers (DRBs) through an RRC connection re-establishment message.

The terminal re-establishes a PDCP for SRB1 and all DRBs.

The terminal re-establishes RLC for SRB1 and all DRBs.

The terminal performs a radio resource configuration according to the received radio resource configuration dedicated information.

The terminal resumes SRB1 and all DRBs.

The terminal updates a $K_{eNB}$ key on the basis of a $K_{ASME}$ key, with which a current $K_{eNB}$ is associated, by using an indicated NCC value within an RRC connection re-establishment message.

The terminal derives $K_{RRCint}$ associated with a pre-configured integrity algorithm.

The terminal derives $K_{RRCint}$ and $K_{UPenc}$ associated with a pre-configured ciphering algorithm.

The terminal configures integrity protection to be activated in a lower layer by using a pre-configured algorithm and $K_{RRCint}$.

The terminal configures a ciphering algorithm, $K_{RRCint}$, and $K_{UPenc}$ to be applied to a lower layer.

The terminal transmits an RRC connection re-establishment complete message to the base station.

Fifth Embodiment: Method for Supporting Mobility Through RRC Connection Resume

The use of a general handover procedure, applied to a typical terminal, for an NB-IoT terminal becomes a significant overhead. That is, a method for causing an NB-IoT terminal to transmit, in time, measurement reporting and causing a base station to perform a handover on the basis of the measurement reporting may become a significant overhead. In order to make this situation better, the following mobility support method can be provided to a connected terminal.

For example, a base station may inform of a terminal a critical criterion that triggers cell change for the terminal. When the terminal reaches the criterion (after cell change), the terminal may trigger an RRC connection resume.

An event for triggering cell change (e.g., cell change criterion) may be defined.

For example, an event for triggering cell change (e.g., cell change criterion) may be defined as an A3 event (neighbor becomes amount of offset better than PCell) of a typical LTE terminal.

As another example, an event for triggering cell change (e.g., cell change criterion) may be defined as an A2 event (serving becomes worse than absolute threshold) of a typical LTE terminal.

As still another example, an event for triggering cell change (e.g., cell change criterion) may be defined as an A2 event (serving becomes worse than absolute threshold) and A4 event (neighbor becomes better than absolute threshold) of a typical LTE terminal.

As yet another example, an event for triggering cell change (e.g., cell change criterion) may be defined as a Radio Link Failure (RLF) criterion of a typical LTE terminal. On the basis of the RLF criterion, a terminal may detect a radio link failure through an RLF timer and a related parameter broadcasted by a base station through system information.

When two events are simultaneously satisfied, the terminal may trigger the above-described procedure.

The base station may recognize a terminal capable of performing the above-described operations through terminal capability information. The base station may generate information to instruct the terminal to perform the above-described operations.

When an RRC connection resume procedure is initiated (or before initiation of an RRC connection resume procedure, or when reaching a cell change criterion, or when an RRC connection resume procedure for a cell change is initiated, or in order to transmit an RRC connection resume request message to a target base station), the terminal may perform at least one operation among the following operations.

For example, the terminal stores an AS context including at least one of a current RRC connection, a current security context, a PDCP state including a Robust Header Compression (ROHC) state, a C-RNTI used by a source PCell, a physical cell identifier of the source PCell, and a cell identifier (cellIdentity) thereof.

As another example, the terminal maintain an AS context including at least one of a current RRC connection, a current security context, a PDCP state including an ROHC state, a C-RNTI used by a source PCell, a physical cell identifier of the source PCell, and a cell identifier (cellIdentity) thereof.

As still another example, an AS context, which includes at least one of a current RRC connection, a current security context, a PDCP state including an ROHC state, a C-RNTI used by a source PCell, a physical cell identifier of the source PCell, and a cell identifier (cellIdentity) thereof, is suspended.

The terminal stores/maintains a resume identifier/terminal identifier/base station identifier and a terminal identifier (for convenience of description, hereinafter, it may be expressed as a resume identifier).

The terminal suspends all of SRB(s) and DRB(s).

When a timer (e.g., T310 or T312) is on, the terminal stops the timer.

The terminal resets a MAC.

The terminal starts synchronization with downlink of a target cell. The terminal may select a target cell on the basis of neighboring cell information satisfying the above-described cell change criterion.

The terminal acquires Management Information Base (MIB) information from the target cell. The terminal acquires, from the target cell, RRC connection resume request-related system information (e.g., a Random Access (RA)-preamble). In another manner, the terminal may receive RRC connection resume request-related information (e.g., a RA-preamble, etc.) of a neighboring cell through system information or dedicated information from a source cell.

The terminal applies a default physical channel configuration.

The terminal applies a default MAC main configuration.

The terminal applies a (default) Common Control Channel (CCCH) configuration (specified in section 9.1.1.2 of the 3GPP TS36.331 document).

The terminal starts a related timer (e.g., T300).

The terminal transmits, to the base station, an RRC connection resume request message (for convenience of description, a description is made as using an RRC connection resume request message, but a new RRC connection message for supporting mobility also falls within the scope of the present disclosure).

In an RRC connection resume request message, a resume identifier/terminal identifier is set to resumeIdentity/UEIdentity indicated by a source base station. Alternatively, a resume identifier is set to a stored resumeIdentity.

A short-resume-MAC-I is set to 16 least significant bits of the calculated MAC-I.

A resume cause (resumeCause) is set to cell change (or mobility support or a handover).

Even when the terminal is instructed to perform access barring check through system information of a target base station/cell, the terminal may disregard this command. Alternatively, the terminal is allowed not to perform access barring check for a typical LTE terminal.

The target base station transmits an RRC connection resume message to the terminal.

Upon the receipt of an RRC connection resume message, the terminal performs following operations.

The terminal stops a related timer (e.g., T300).

The terminal resumes an RRC connection.

The terminal resumes a security context.

The terminal re-establishes an RLC entity of all of SRBs and DRBs.

The terminal re-establishes a PDCP entity of all of SRBs and DRBs.

The terminal discards a resume identifier (resumeIdentity).

The terminal performs a radio resource configuration according to the received radio resource configuration dedicated information.

The terminal resumes all of SRBs and DRBs.

The terminal updates a $K_{eNB}$ key on the basis of a $K_{ASME}$ key, with which a current $K_{eNB}$ is associated, by using an indicated NCC value within an RRC connection resume message.

The terminal derives $K_{RRCint}$ associated with a pre-configured integrity algorithm.

The terminal requests verification of integrity protection of an RRC connection resume message in a lower layer, using a pre-configured algorithm and $K_{RRCint}$.

The terminal derives $K_{RRCint}$ and $K_{Upenc}$ associated with a pre-configured ciphering algorithm.

The terminal configures integrity protection to be activated in a lower layer by using a pre-configured algorithm and $K_{RRCint}$.

The terminal configures a ciphering algorithm, $K_{RRCint}$, and $K_{Upenc}$ to be applied to a lower layer.

The terminal considers a current cell as a PCell.

The terminal transmits an RRC connection resume complete message to the target base station.

In another example of transmitting an RRC connection resume request message to a target base station, a terminal performs operations as follows.

The terminal starts synchronization with downlink of a target cell. Alternatively, the terminal may select a target cell on the basis of neighboring cell information satisfying the above-described cell change criterion.

The terminal acquires MIB information from the target cell. Alternatively, the terminal acquires RRC connection resume request-related system information (e.g., a RA-preamble, etc.) from the target cell. In another manner, the terminal may receive RRC connection resume request-related information (e.g., a RA-preamble, etc.) of a neighboring cell through system information or dedicated information from a source cell.

The terminal applies a default physical channel configuration.

The terminal applies a default MAC main configuration.

The terminal applies a (default) CCCH configuration (specified in section 9.1.1.2 of 3GPP TS36.331).

The terminal starts a related timer (e.g., T300).

The terminal transmits, to the base station, an RRC connection resume request message (for convenience of description, a description is made as using an RRC connection resume request message, but a new RRC connection message for supporting mobility also falls within the scope of the present disclosure).

In an RRC connection resume request message, a resume identifier/terminal identifier is set to resumeIdentity/UEIdentity indicated by a source base station. Alternatively, a resume identifier is set to a stored resumeIdentity.

A short-resume-MAC-I is set to 16 least significant bits of the calculated MAC-I.

A resume cause (resumeCause) is set to a cell change (or mobility support or a handover).

The above-described operation may be an operation for supporting mobility of an RRC-connected terminal. Accordingly, the terminal is allowed not to perform measurement and evaluation related to cell reselection. Also, the terminal is allowed not to perform an access barring check procedure. In the related art, an RRC connection resume procedure is used to resume a connection of an RRC idle state terminal. Accordingly, the terminal has to perform measurement and evaluation related to cell reselection, and an access barring check procedure in the process of resuming an RRC connection.

The target base station transmits an RRC connection resume message to the terminal.

Upon the receipt of an RRC connection resume message, the terminal performs operations as follows.

The terminal stops a related timer (e.g., T300).

The terminal restores an RRC connection and a security context from a stored/maintained terminal AS context.

The terminal re-establishes an RLC entity of all of SRBs and DRBs.

The terminal re-establishes a PDCP entity of all of SRBs and DRBs.

When a terminal AS context and a resume identity (resumeIdentity) are stored, the terminal discards the stored terminal AS context and resumes identity.

The terminal performs a radio resource configuration according to the received radio resource configuration dedicated information.

The terminal resumes all of SRBs and DRBs.

The terminal updates a $K_{eNB}$ key on the basis of a $K_{ASME}$ key, with which a current $K_{eNB}$ is associated, by using an indicated NCC value within an RRC connection resume message.

The terminal derives $K_{RRCint}$ associated with a pre-configured integrity algorithm.

The terminal requests verification of integrity protection of an RRC connection resume message in a lower layer, using a pre-configured algorithm and $K_{RRCint}$.

The terminal derives $K_{RRCint}$ and $K_{UPenc}$ associated with a pre-configured ciphering algorithm.

The terminal configures integrity protection to be activated in a lower layer by using a pre-configured algorithm and $K_{RRCint}$.

The terminal configures a ciphering algorithm, $K_{RRCint}$, and $K_{UPenc}$ to be applied to a lower layer.

The terminal considers a current cell as a PCell.

The terminal transmits an RRC connection resume complete message to the target base station.

The above-described target base station having received an RRC connection resume message may fail to resume an RRC connection or may desire to instruct the terminal to establish an RRC connection, for any reason (e.g., the target base station fails to retrieve a terminal context from a source base station, or does not have a terminal context and thus is not ready for a handover, or the like).

As described above, for any reason, the above-described target base station having received an RRC connection resume message may not transmit an RRC connection resume success message (an RRC connection resume message), and instead, may transmit an RRC connection setup message to the terminal.

When an RRC connection setup message is received in response to an RRC connection resume request message, the terminal may perform at least one of the following operations.

The terminal removes a terminal AS context and a resume identifier. The terminal sends, to a higher layer, a request for information (e.g., an S-TMSI) required to set up/receive/retrieve/establish a terminal context from an MME. The terminal sets, to a value received from the higher layer, an s-TMSI within an RRC connection setup complete message. The terminal may include, in the RRC connection setup complete message, a message/information received from the higher layer.

A typical RRC connection resume procedure is used to restore an AS configuration including an SRB and a DRB from the stored context, for an RRC idle terminal, the RRC connection of which has been released due to an RRC suspend.

According to the present embodiment, an RRC connection resume procedure may be used even for an RRC-connected terminal.

Also, the typical RRC connection resume procedure may be applied to an NB-IoT terminal supporting both a control plane CIoT EPS optimization and a user plane CIoT EPS optimization, or an NB-IoT terminal supporting a user plane CIoT EPS optimization. In the related art, the typical RRC connection resume procedure may not support an NB-IoT terminal supporting only a control plane CIoT EPS optimization. However, according to the embodiments of the present disclosure, it is possible to use an RRC connection resume procedure even for the NB-IoT terminal supporting only a control plane CIoT EPS optimization.

In the related art, a resume identifier of a terminal is configured for RRC connection suspend. Accordingly, the resume identifier may be provided to be included in only an RRC connection release message. That is, when an RRC connection suspend is a release cause, a resume identifier is included in an RRC connection release message, and the RRC connection release message including a resume identifier is transmitted to the terminal.

When an RRC connection resume procedure is used to support mobility of an RRC-connected terminal, a resume identifier may be previously transmitted to the terminal through an RRC connection reconfiguration message.

Six Embodiment: Method for Supporting Mobility Through New RRC Connection Procedure/RRC Connection Message Type The use of a general handover procedure, applied to a typical terminal, for an NB-IoT terminal becomes a significant overhead. That is, a method for causing an NB-IoT terminal to transmit, in time, measurement reporting and causing a base station to perform a handover on the basis of the measurement reporting may become a significant overhead. In order to make this situation better, the following mobility support method may be provided to a connected terminal.

For example, a base station may inform of a terminal a critical criterion for triggering cell change for the terminal. When the terminal reaches the criterion, the terminal may trigger an RRC connection cell change procedure (for convenience of description, hereinafter, an RRC connection cell change procedure is expressed as an RRC connection cell change. The same is used for supporting mobility of a connected terminal and may be changed/replaced by another term).

An event for triggering cell change (cell change criterion) may be defined.

For example, an event for triggering cell change (e.g., cell change criterion) may be defined as an A3 event (neighbor becomes amount of offset better than PCell) of a typical LTE terminal.

As another example, an event for triggering cell change (e.g., cell change criterion) may be defined as an A2 event (serving becomes worse than absolute threshold) of a typical LTE terminal.

As still another example, an event for triggering cell change (e.g., cell change criterion) may be defined as an A2 event (serving becomes worse than absolute threshold) and A4 event (neighbor becomes better than absolute threshold) of a typical LTE terminal.

As yet another example, an event for triggering cell change (e.g., cell change criterion) may be defined as, a Radio Link Failure (RLF) criterion of a typical LTE terminal. On the basis of the RLF criterion, a terminal may detect a radio link failure through an RLF timer and a related parameter broadcasted by a base station through system information.

When two events are simultaneously satisfied, the terminal may trigger the above-described procedure.

The base station may recognize a terminal capable of performing the above-described operations through terminal capability information. The base station may generate information for instructing the terminal to perform the above-described operation.

An RRC connection cell change procedure may be applied to i) an NB-IoT terminal supporting only a control plane CIoT EPS optimization, ii) an NB-IoT terminal supporting both a control plane CIoT EPS optimization and a user plane CIoT EPS optimization, or iii) an NB-IoT terminal supporting a user plane CIoT EPS optimization.

Both an RRC connection re-establishment procedure and an RRC connection resume procedure according to the related art are procedures applicable to an RRC idle state terminal. Accordingly, in order to be used as a procedure for supporting cell change for an RRC-connected terminal, indication information for identification of a terminal may be needed as described above. In another manner, it may be necessary to define a new RRC procedure distinguished from an RRC connection re-establishment procedure or an RRC connection resume procedure. Hereinafter, for convenience of description, such a new RRC procedure will be expressed as an RRC connection cell change procedure.

An RRC connection cell change procedure may be provided through SRB0. This request is not ciphered but may be protected by a message authentication code. That is, an RRC connection cell change request message, triggered by a terminal, may be protected by a message authentication code, and thus may be used for an NB-IoT terminal which supports only a control plane CIoT EPS optimization and in which AS security is not activated. Such a message authentication code may include NAS authentication code information (NAS MAC) for checking message authentication of a terminal by using an MME.

When an RRC connection cell change procedure is initiated (or before initiation of an RRC connection cell change procedure, or when reaching a cell change criterion, or when an RRC connection cell change procedure for a cell change is initiated, or in order to transmit an RRC connection cell change request message to a target base station), the terminal may perform at least one of the following operations.

For example, the terminal maintains an AS context including at least one of a current RRC connection, a current security context, a PDCP state including a ROHC state, a C-RNTI used by a source PCell, a physical cell identifier of the source PCell, and a cell identifier (cellIdentity) thereof.

As still another example, an AS context, which includes at least one of a current RRC connection, a current security context, a PDCP state including an ROHC state, a C-RNTI used by a source PCell, a physical cell identifier of the source PCell, and a cell identifier (cellIdentity) thereof, is suspended.

The terminal stores/maintains a resume identifier/terminal identifier/base station identifier and a terminal identifier (for convenience of description, hereinafter, it may be expressed as a resume identifier).

The terminal suspends all of SRB(s) and DRB(s).

When a timer (e.g., T310 or T312) is on, the terminal stops the timer.

The terminal resets a MAC.

The terminal starts synchronization with downlink of a target cell. Alternatively, the terminal may select a target cell on the basis of neighboring cell information satisfying the above-described cell change criterion.

The terminal acquires MIB information from the target cell. Alternatively, the terminal acquires, from the target cell, RRC connection cell change request-related system information (e.g., a RA-preamble). In another manner, the terminal may receive RRC connection cell change request-related information (e.g., a RA-preamble, etc.) of a neighboring cell through system information or dedicated information from a source cell.

The terminal applies a default physical channel configuration.

The terminal applies a default MAC main configuration.

The terminal applies a (default) CCCH configuration (specified in section 9.1.1.2 of TS36.331).

The terminal starts a related timer (e.g., T300).

The terminal transmits an RRC connection cell change request message to the base station, In an RRC connection cell change request message, a resume identifier/terminal identifier is set to resumeIdentity/UEIdentity indicated by a source base station.

A short-resume-MAC-I is set to 16 least significant bits of the calculated MAC-I.

A resume cause (resumeCause) is set to cell change (or mobility support or a handover).

Even when the terminal is instructed to perform access barring check through system information of a target base station/cell, the terminal may disregard this command. The terminal is allowed not to perform access barring check for a typical terminal.

The target base station transmits an RRC connection cell change message to the terminal.

The terminal having received an RRC connection cell change message operates, for example, as follows.

The terminal stops a related timer (e.g., T300).

The terminal resumes an RRC connection.

The terminal resumes a security context.

The terminal re-establishes an RLC entity of all of SRBs and DRBs.

The terminal re-establishes a PDCP entity of all of SRBs and DRBs.

The terminal discards a resume identifier (resumeIdentity).

The terminal performs a radio resource configuration according to the received radio resource configuration dedicated information.

The terminal resumes all of SRBs and DRBs.

The terminal updates a $K_{eNB}$ key on the basis of a $K_{ASME}$ key, with which a current $K_{eNB}$ is associated, by using an indicated NCC value within an RRC connection cell change message.

The terminal derives $K_{RRCint}$ associated with a pre-configured integrity algorithm.

The terminal requests verification of integrity protection of an RRC connection resume message in a lower layer, using a pre-configured algorithm and $K_{RRCint}$.

The terminal derives $K_{RRCint}$ and $K_{UPenc}$ associated with a pre-configured ciphering algorithm.

The terminal configures integrity protection to be activated in a lower layer by using a pre-configured algorithm and $K_{RRCint}$.

The terminal configures a ciphering algorithm, $K_{RRCint}$, and $K_{UPenc}$ to be applied to a lower layer.

The terminal considers a current cell as a PCell.

The terminal transmits an RRC connection cell change complete message to the target base station.

The above-described target base station having received an RRC connection cell change message may not successfully perform an RRC connection cell change or may instruct the terminal to establish an RRC connection, for any reason (e.g., the target base station fails to retrieve a terminal context from a source base station, or does not have a terminal context and thus is not ready for a handover, or the like).

As described above, for any reason, the above-described target base station having received an RRC connection cell change message may not transmit an RRC connection cell change success message (an RRC connection cell change message), and instead, may transmit an RRC connection setup message to the terminal.

When an RRC connection setup message is received in response to an RRC connection cell change request message, the terminal may perform at least one operation among the following operations.

The terminal deletes/removes/discards a terminal AS context and a resume identifier. The terminal sends, to a higher layer, a request for information (e.g., an S-TMSI) required to set up/receive/retrieve/establish a terminal context from an MME. The terminal sets, to a value received from the higher layer, an s-TMSI within an RRC connection setup complete message. The terminal may include, in the RRC connection setup complete message, a message/information received from the higher layer.

In the related art, a resume identifier of a terminal is configured for RRC connection suspend, and thus may be provided to be included in only an RRC connection release message. That is, when an RRC connection suspend is a release cause, a resume identifier is included in an RRC connection release message, and the RRC connection release message including a resume identifier is indicated to the terminal.

When an RRC connection cell change procedure is used to support mobility of an RRC-connected terminal, a resume identifier may be configured to be previously indicated to the terminal through an RRC connection reconfiguration message.

Figure 4:
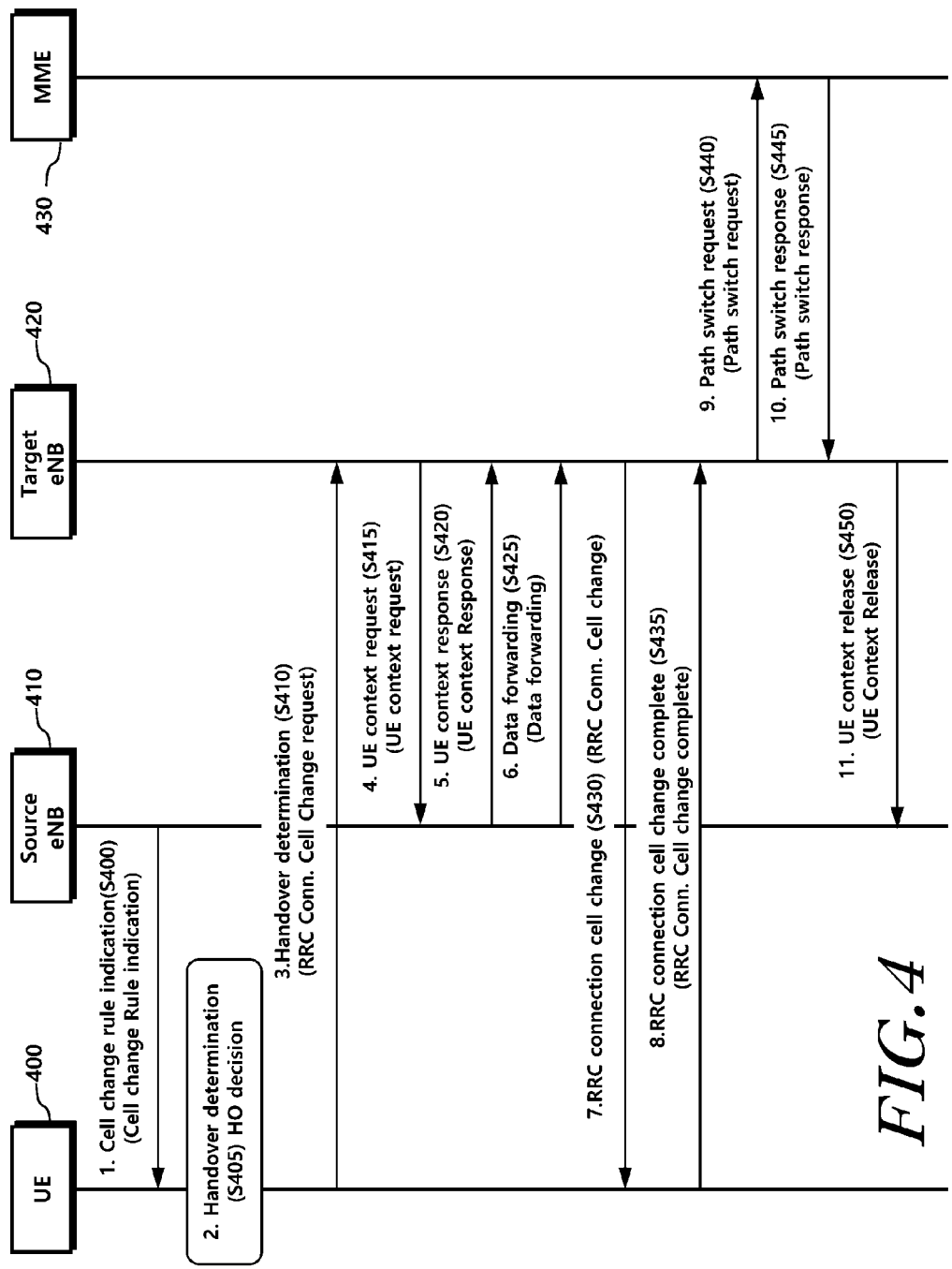
FIG. 4 is a signal flow diagram illustrating a cell change procedure of a connected terminal according to an embodiment.

FIG. 4 is a signal flow chart illustrating a cell change procedure of a connected terminal according to an embodiment.

Referring to FIG. 4, base stations 410 and 420 recognize that a terminal 400 is capable of performing the above-described cell change through terminal capability information. As another example, base stations 410 and 420 may indicate support for the above-described cell change in a cell through system information.

For example, information indicating support for cell change and provided through system information represents information indicating permission of transmission of an RRC message triggered by a terminal, to an NB-IoT terminal supporting only a control plane CIoT EPS optimization. As another example, the information indicating support for cell change and provided through system information represents information indicating permission of transmission of an RRC message triggered by a terminal, to an NB-IoT terminal supporting both a control plane CIoT EPS optimization and a user plane CIoT EPS optimization.

In operation S400, the source base station 410 transmits, to the terminal 400, a cell change criterion/rule/threshold/event of a connected terminal. For example, a cell change criterion/rule/threshold/event may be included in an RRC connection reconfiguration message. As another example, a cell change criterion/rule/threshold/event may be included in an RRC connection setup message in the case of a terminal using a control plane CIoT EPS optimization. As still another example, a cell change criterion/rule/threshold/event may be an RLF timer and a related parameter terminal-specifically configured by a base station. As yet another example, a cell change criterion/rule/threshold/event may be an RLF timer and a related parameter broadcasted by a base station through system information. As still yet another example, a cell change criterion/rule/threshold/event may be an RLF timer and a related parameter broadcasted by a base station through system information.

In operation S405, when the cell change criterion/rule/threshold/event of a connected terminal is exceeded/reached/satisfied, the terminal 400 may initiate the above-described cell change procedure. For example, when an RLF criterion is reached, the terminal 400 may trigger the above-described cell change procedure.

In operation S410, the terminal 400 may transmit, to the target base station 420, an RRC message for cell change.

In operation S415, the target base station 420 sends, to the source base station 410, a request for a terminal context. As another example, the target base station 420 sends, to an MME 430, for a terminal context.

In operation S420, the source base station 410 responds to the request.

In operation S425, data forwarding may be performed.

In operation S430, the target base station 420 transmits, to the terminal 400, an RRC message for configuring an RRC cell change. For example, the above-described RRC message may be an RRC connection reconfiguration message. As another example, the above-described RRC message may be an RRC message distinguished from an RRC connection reconfiguration message.

In operation S435, the terminal 400 transmits a check message to the target base station 420.

In operation S440, the target base station 420 transmits a path switch request message to an MME 430.

In operation S445, the MME 430 responds to the path switch request message.

In operation S450, the target base station 420 indicates a terminal context release to the source base station 410.

In another method, operations S415 to S425 may be performed simultaneously with operations S430 and S435, or may be performed after operations S430 and S435.

Cell change to the target base station 420 may be attempted in operation S415 while the source base station 410 does not recognize the attempt. It wastes radio resources or causes interference. In order to prevent this situation, the terminal 400 may deliver, to the source base station 410, information indicating an attempt for cell change to the target base station, arrival at a threshold for cell change to the target base station, or the like. In order to deliver the information, an RRC message may be used, or a Medium Access Control (MAC) Control Element (CE) or PHY signaling may be used for rapid transmission.

As described above, according to the embodiments of the present disclosure, service continuity of a connected NB-IoT terminal may be improved.

Hereinabove, the description has made of an RRC suspend method for reducing power consumption of an NB-IoT terminal, an embodiment of supporting low-power mobility, and an example of a cell change procedure.

Hereinafter, the present disclosure proposes various embodiments of a method for minimizing occurrence of data interruption until completion of cell change with a target base station when an NB-IoT terminal performs an operation according to the above-described mobility support and cell change procedure.

First Embodiment: Method for Requesting MME for Terminal Context for Terminal Reconfiguration/Change/Re-Establishment by Target Base Station When a terminal transmits, to a target base station, an RRC message for requesting cell change in order to directly attempt to change a cell, the target base station receiving the relevant message enables the terminal having requested cell change to configure/reconfigure/resume/change/re-establish an RRC connection of the terminal.

In order to configure/reconfigure/resume/change a connection of the terminal having requested cell change, the target base station may request a core network entity (in LTE, an MME, that is, a core network control plane entity) for a terminal context of the terminal. To this end, the terminal may include, as a terminal identifier, an S-TMSI for identification of a serving MME in the RRC message transmitted to the target base station so as to request cell change. An S-TMSI may include an MME Code (MMEC) and an m-Temporary Mobile Subscriber Identity (m-TMSI) and may allow identification of a serving MME for a terminal.

A message for requesting a terminal context to an MME may be one message among S1 messages. For example, a message for requesting a terminal context to an MME may be one message among an Evolved radio access bearer (E-RAB) setup/modify/release request/response message, an initial context setup/modification request/response message, and an eNB status transfer message.

As another example, a message for requesting a terminal context to an MME may be a UE context release request message.

As still another example, a message for requesting a terminal context to an MME may be a handover required message.

As yet another example, a message for requesting a terminal context to an MME may be a handover notify message. For example, the target base station may notify the MME of a cell change request of the terminal.

As still yet another example, for requesting a terminal context to an MME may be a path switch request message.

As still yet another example, for requesting a terminal context to an MME may be a terminal context resume request message.

As further another example, for requesting a terminal context to an MME may be a new S1 message distinguished from the above-described messages.

In order to reduce data transmission interruption, the above-described message for requesting a terminal context to an MME may include S-TMSI information for distinguishing between terminals by the MME, NAS authentication code information (NAS MAC) for checking message authentication of a terminal by the MME, and information for reducing data transmission interruption. For example, the above-described message may include information requesting transmission of uplink PDCP SN and HFN reception state and/or downlink PDCP SN and HFN transmission state from a source base station.

For example, when the above-described message for requesting a terminal context to an MME is a terminal context resume message, the terminal context resume message may include information requesting transmission of uplink PDCP SN and HFN reception state and/or downlink PDCP SN and HFN transmission state from a source base station. A terminal context resume message is a message used to indicate, by the MME, resumption of the suspended RRC connection and thus, when the target base station uses this message to request the MME for a terminal context of an RRC-connected terminal, the terminal context resume message may include information indicating whether the MME is used to indicate resumption of the suspended RRC connection.

When the MME receives, from the target base station, information requesting transmission of uplink PDCP SN and HFN reception state and/or downlink PDCP SN and HFN transmission state, the MME may deliver the received information to the source base station. When the source base station receives this information, the source base station may transmit, to the MME, information on uplink PDCP SN and HFN reception state and/or downlink PDCP SN and HFN transmission state. The MME may again transmit, to the target base station, information on uplink PDCP SN and HFN reception state and/or downlink PDCP SN and HFN transmission state.

When the MME receives, from the target base station, a message requesting a terminal context, the MME may transmit a terminal context of the relevant terminal to the target base station. The MME may retrieve terminal context information of the relevant terminal through the source base station and may deliver the same to the target base station.

When: the source base station receives, from the MME, a message requesting delivering a terminal context to the target base station; the source base station receives, from the MME, information requesting transmission of uplink PDCP SN and HFN reception state and/or downlink PDCP SN and HFN transmission state, which is to be delivered to the target base station; or the source base station receives, from the MME, information suggesting/indicating data forwarding, the source base station may start data forwarding to the target base station through an uplink/downlink tunnel with the target base station.

To this end, a message for requesting a terminal context to the MME, and/or a message that the MME indicates to the source base station according to a message for requesting a terminal context to the MME may include at least one piece of information among uplink forwarding suggestion/indication information, downlink forwarding suggestion/indication information, forwarding suggestion/indication information, uplink GPRS tunneling protocol (GTP) tunnel endpoint information for data forwarding, and downlink GTP tunnel endpoint information for data forwarding.

The above-described information on uplink PDCP SN and HFN reception state and/or downlink PDCP SN and HFN transmission state may be information distinguished for each bearer.

The above-described uplink GTP tunnel endpoint information for data forwarding, and downlink GTP tunnel endpoint information for data forwarding may be information distinguished for each bearer.

Second Embodiment: Method for Requesting Source Base Station for Terminal Context by Target Base Station When a terminal transmits, to a target base station, an RRC message for requesting cell change in order to directly attempt to change a cell, the target base station receiving the relevant message enables the terminal having requested cell change to configure/reconfigure/resume/change/re-establish an RRC connection of the terminal.

In order to configure/reconfigure/resume/change a connection of the terminal having requested cell change, the target base station may request a source base station for a terminal context of the terminal. To this end, the terminal may include, as a terminal identifier, terminal identification information including base station identification information in the RRC message transmitted to the target base station to request cell change. For example, a resume ID may be used as a terminal identifier. A resume ID may include base station identification information of a source base station and terminal identification information, assigned by the source base station, to allow identification of a source base station for the terminal. As another example, identification information of a source base station and C-RNTI information assigned by the source base station may be used as a terminal identifier. As still another example, source cell identification information and C-RNTI information assigned by a source base station may be used as a terminal identifier. As yet another example, a combination of one or more of source cell identification information, identification information of a source base station, C-RNTI information assigned by the source base station, and shortMAC-I may be used as a terminal identifier.

A message for requesting a terminal context to the source base station by the target base station may be one message among X2 messages.

For example, a message for requesting a terminal context to the source base station may be a retrieve UE context request message.

As another example, a message for requesting a terminal context to the source base station may be a UE context release message.

As still another example, a message for requesting a terminal context to the source base station may be a handover report message.

As yet another example, a message for requesting a terminal context to the source base station may be a new X2 message distinguished from the above-described messages.

In order to reduce data transmission interruption, the above-described message for requesting a terminal context to the source base station may include C-RNTI information for distinguishing between terminals by the source base station, AS authentication code information (AS MAC) for checking message authentication of a terminal by the source base station, and information for reducing data transmission interruption. For example, the above-described message may include information requesting transmission of uplink PDCP SN and HFN reception state and/or downlink PDCP SN and HFN transmission state from a source base station.

For example, when the above-described message for requesting a terminal context to the source base station is a retrieve UE context request message, the retrieve UE context request message may include information requesting transmission of uplink PDCP SN and HFN reception state and/or downlink PDCP SN and HFN transmission state from a source base station. A retrieve UE context request message is a message used to retrieve a terminal context from a previous base station, in which an RRC connection has been suspended, and transmit the retrieved terminal context to a new base station which is requested to resume the RRC connection. When the target base station uses this message to request the source base station for a terminal context of an RRC-connected terminal, this message may be used to retrieve a terminal context from the previous base station, in which the RRC connection has been suspended, and may include information indicating whether the retrieved terminal context is a context for resuming an RRC connection.

When the source base station receives, from the target base station, information requesting transmission of uplink PDCP SN and HFN reception state and/or downlink PDCP SN and HFN transmission state, the source base station may transmit information on uplink PDCP SN and HFN reception state and/or downlink PDCP SN and HFN transmission state.

When the source base station receives, from the target base station, a message requesting a terminal context, the source base station may transmit a terminal context of the relevant terminal to the target base station.

When the source base station receives a message requesting delivering a terminal context to the target base station, or when the source base station receives, from the target base station, information requesting transmission of uplink PDCP SN and HFN reception state and/or downlink PDCP SN and HFN transmission state (or the source base station receives, from the target base station, information suggesting/indicating data forwarding), the source base station may start data forwarding to the target base station through an uplink/downlink tunnel with the target base station.

To this end, a message for requesting a terminal context to the source base station may include at least one piece of information among uplink forwarding suggestion/indication information, downlink forwarding suggestion/indication information, forwarding suggestion/indication information, uplink GTP tunnel endpoint information for data forwarding, and downlink GTP tunnel endpoint information for data forwarding.

The above-described information on uplink PDCP SN and HFN reception state and/or downlink PDCP SN and HFN transmission state may be information distinguished for each bearer.

The above-described uplink GTP tunnel endpoint information for data forwarding, and downlink GTP tunnel endpoint information for data forwarding may be information distinguished for each bearer.

Third Embodiment: Method for Requesting Anchor Base Station for Terminal Context by Target Base Station For example, when a terminal establishes an initial RRC connection, a particular base station maintaining a terminal context may be defined as anchor base station. As another example, when an anchor base station maintaining a terminal context is present in a particular area or at particular time, a target base station may request the anchor base station to deliver data.

When a terminal transmits, to a target base station, an RRC message for requesting cell change in order to directly attempt to change a cell, the target base station receiving the relevant message enables the terminal having requested cell change to configure/reconfigure/resume/change/re-establish an RRC connection of the terminal.

In order to configure/reconfigure/resume/change a connection of the terminal having requested cell change, the target base station may request an anchor base station for a terminal context of the terminal. To this end, the terminal may include, as a terminal identifier, terminal identification information including anchor base station identification information in the RRC message transmitted to the target base station so as to request cell change. As an example, a resume ID may be used as a terminal identifier. A resume ID may include base station identification information of an anchor base station and terminal identification information, assigned by the anchor base station, to allow identification of an anchor base station for the terminal. As another example, identification information of an anchor base station and C-RNTI information assigned by the source base station may be used as a terminal identifier. As still another example, source cell identification information and C-RNTI information assigned by an anchor base station may be used as a terminal identifier. As yet another example, a combination of one or more of source cell identification information, identification information of an anchor base station, C-RNTI information assigned by the source base station, and shortMAC-I may be used as a terminal identifier.

A message for requesting terminal context to the anchor base station by the target base station may be one message among X2 messages.

As an example, a message for requesting terminal context to the anchor base station may be a retrieve UE context request message.

As another example, a message for requesting terminal context to the anchor base station may be a UE context release message.

As still another example, a message for requesting terminal context to the anchor base station may be a handover report message.

As yet another example, a message for requesting terminal context to the anchor base station may be a new X2 message distinguished from the above-described messages.

In order to reduce data transmission interruption, the above-described message for requesting terminal context to the anchor base station may include resume ID information for distinguishing between terminals by the anchor base station, AS authentication code information (AS MAC) for checking message authentication of a terminal by the anchor base station, and information for reducing data transmission interruption. For example, the above-described message may include information requesting transmission of uplink PDCP SN and HFN reception state and/or downlink PDCP SN and HFN transmission state from a source base station.

When the anchor base station receives, from the target base station, information requesting transmission of uplink PDCP SN and HFN reception state and/or downlink PDCP SN and HFN transmission state, the anchor base station may deliver the received information to the source base station. When the source base station receives this information, the source base station may transmit, to the anchor base station, information on uplink PDCP SN and HFN reception state and/or downlink PDCP SN and HFN transmission state. The anchor base station may again transmit, to the target base station, information on uplink PDCP SN and HFN reception state and/or downlink PDCP SN and HFN transmission state.

When the anchor base station receives, from the target base station, a message requesting a terminal context, the anchor base station may transmit a terminal context of the relevant terminal to the target base station. The anchor base station may retrieve terminal context information of the relevant terminal through the source base station, and may deliver the same to the target base station.

When the source base station receives, from the anchor base station, a message requesting delivering a terminal context to the target base station, or when the source base station receives, from the anchor base station, information requesting transmission of uplink PDCP SN and HFN reception state and/or downlink PDCP SN and HFN transmission state, which is to be delivered to the target base station (or the source base station receives, from the anchor base station, information suggesting/indicating data forwarding), the source base station may start data forwarding to the target base station through an uplink/downlink tunnel with the target base station.

To this end, i) a message for requesting a terminal context to the anchor base station by the target base station, and/or ii) a message for instructing the source base station by the anchor base station according to the message for requesting a terminal context to the anchor base station may include at least one piece of information among uplink forwarding suggestion/indication information, downlink forwarding suggestion/indication information, forwarding suggestion/indication information, uplink GTP tunnel endpoint information for data forwarding, and downlink GTP tunnel endpoint information for data forwarding.

The above-described information on uplink PDCP SN and HFN reception state and/or downlink PDCP SN and HFN transmission state may be information distinguished for each bearer.

The above-described uplink GTP tunnel endpoint information for data forwarding, and downlink GTP tunnel endpoint information for data forwarding may be information distinguished for each bearer.

In order to improve service continuity in the connected NB-IoT, the above-described methods may be applied to an NB-IoT terminal supporting only a control plane CIoT EPS optimization, an NB-IoT terminal supporting both a control plane CIoT EPS optimization and a user plane CIoT EPS optimization, or an NB-IoT terminal supporting only a user plane CIoT EPS optimization.

As described above, according to the embodiments of the present disclosure, it possible to change a cell or a base station while shortening a data transmission interruption time.

Hereinafter, structures of an NB-IoT terminal and a base station capable of performing all or some of the above-described embodiments of the present disclosure will be described with reference to the accompanying drawings.

Figure 5:
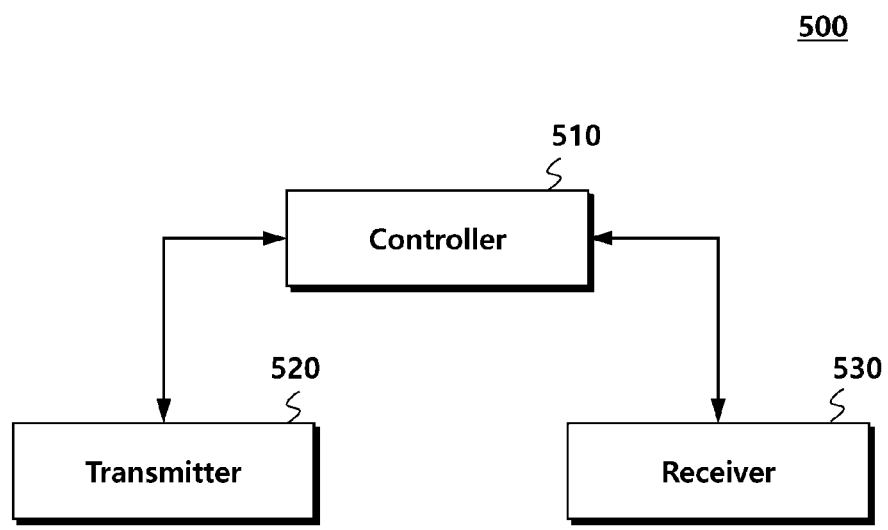
FIG. 5 is a diagram illustrating a terminal according to an embodiment.

FIG. 5 is a diagram illustrating a structure of a terminal according to an embodiment.

Referring to FIG. 5, an NB-IoT terminal 500 for handling mobility may include: a transmitter 520 configured to transmit an RRC connection re-establishment request message to a base station upon occurrence of a predetermined event; a receiver 530 configured to receive an RRC connection re-establishment message from the base station; and a controller 510 configured to resume a signaling radio bearer on the basis of the RRC connection re-establishment message.

For example, the controller 510 may determine whether a predetermined event condition is satisfied, and when the relevant event condition is satisfied, the transmitter 520 may transmit an RRC connection re-establishment request message to a base station. As an example, a predetermined event may be one of detection of a radio link failure by the NB-IoT terminal and detection of a handover failure by the same. As another example, a predetermined event may be set as multiple conditions. For example, the controller 510 may determine that a predetermined event is satisfied i) when the NB-IoT terminal is configured to support a control plane CIoT EPS optimization, ii) when the NB-IoT terminal receives indication information for permitting to re-establish an RRC connection from a base station in a state where AS security is not activated, and when a radio link failure or a handover failure is detected.

An RRC connection re-establishment request message may include terminal identifier information set to an S-TMSI. Through the RRC connection re-establishment request message, the base station may inquire about a terminal context by using the terminal identifier information received from the NB-IoT terminal. For example, a terminal context may be checked using an MME or the contents stored in the base station. Alternatively, when a base station which receives an RRC connection re-establishment request message is a target base station, the target base station may check a terminal context by inquiring of a source base station about the terminal context.

Also, an RRC connection re-establishment request message may include a message authentication code. For example, a message authentication code may include NAS MAC information. Alternatively, an RRC connection re-establishment message may also include message authentication code information. As described above, a message authentication code may include NAS MAC information. An RRC connection re-establishment message may include information for controlling to resume a signaling radio bearer of the NB-IoT terminal.

The controller 510 having received the RRC connection re-establishment message from the base station may resume a signaling radio bearer. As described above, the NB-IoT terminal supporting a control plane CIoT EPS optimization may transmit or receive a little amount of data through the signaling radio bearer. Accordingly, the NB-IoT terminal may resume a signaling radio bearer, thereby minimizing a service interruption and maintaining data communication.

The transmitter 520 may transmit terminal capability information that indicates support for a control plane CIoT EPS optimization. For example, the transmitter 520 may pre-transmit, to a base station, information indicating that the NB-IoT terminal 500 is capable of supporting a control plane CIoT EPS optimization operation, thereby enabling the base station to recognize that the NB-IoT terminal itself can support the same. Terminal capability information may be transmitted during an initial setup of the NB-IoT terminal 500 and the base station.

The receiver 530 may receive information indicating permission of handling of mobility by the NB-IoT terminal 500 through system information from the base station. For example, the base station may transmit, through an RRC connection re-establishment, information indicating permission of an operation of resuming a signaling radio bearer. The controller 510 may check information indicating permission of an operation of resuming a signaling radio bearer, wherein the information is received through system information, and the controller 510n may control the transmitter 520 to transmit an RRC connection re-establishment request message to the base station.

In addition, the receiver 530 receives downlink control information and data, and a message through a relevant channel from the base station. Also, the controller 510 controls an overall operation of the NB-IoT terminal 500 for improving service continuity for the NB-IoT terminal 500 required to perform the above-described present embodiments. The transmitter 520 transmits uplink control information and data, and a message to the base station through a relevant channel.

The above-described NB-IoT terminal may be a terminal configured to support a control plane CIoT EPS optimization. Also, the NB-IoT terminal may signify a terminal which does not configure a data radio bearer and transmits or receives data in a state where AS security is not activated. Further, the above-described base station may be a source base station or a target base station.

Figure 6:
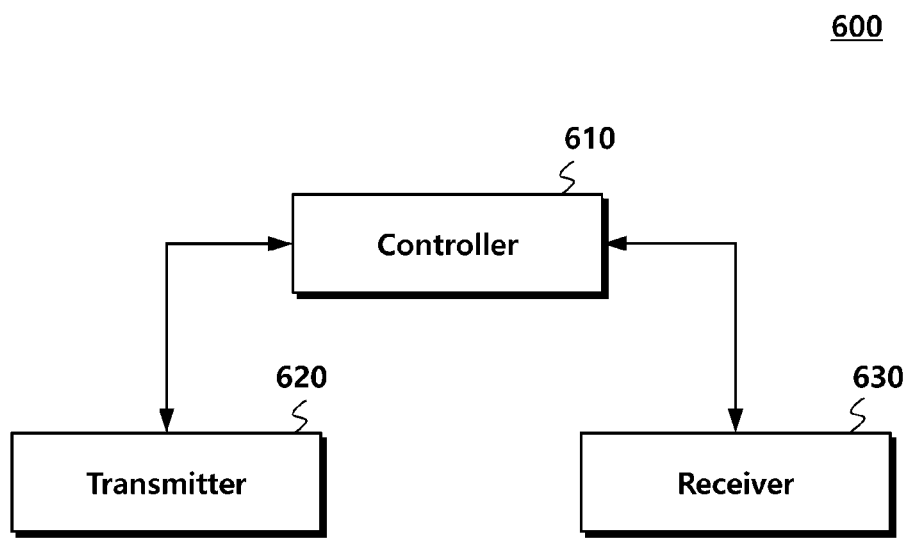
FIG. 6 is a diagram illustrating a base station according to an embodiment.

FIG. 6 is a diagram illustrating a structure of a base station according to an embodiment.

Referring to FIG. 6, a base station 600 for handling mobility of an NB-IoT terminal may include: a receiver 630 configured to receive an RRC connection re-establishment request message from an NB-IoT terminal; a controller 610 configured to check a terminal context of the NB-IoT terminal on the basis of the RRC connection re-establishment request message; and a transmitter 620 configured to transmit an RRC connection re-establishment message for resuming a signaling radio bearer of the NB-IoT terminal.

For example, an RRC connection re-establishment request message may be received when the NB-IoT terminal detects a radio link failure and detects a handover failure. Alternatively, an RRC connection re-establishment request message may be received when multiple conditions are satisfied. For example, the multiple conditions are: i) when the NB-IoT terminal is configured to support a control plane CIoT EPS optimization, ii) when the NB-IoT terminal receives indication information which permits the NB-IoT terminal to re-establish an RRC connection form the base station in a state where AS security is not activated, and iii) a radio link failure or a handover failure is detected.

An RRC connection re-establishment request message may include terminal identifier information set to an S-TMSI. Also, an RRC connection re-establishment request message may include a message authentication code. For example, a message authentication code may include NAS MAC information.

Also, the controller 610 may inquire about a terminal context by using terminal identifier information included in the RRC connection re-establishment request message. For example, a terminal context may be checked using an MME or the contents stored in the base station. Alternatively, when a base station having received an RRC connection re-establishment request message is a target base station, the target base station may check a terminal context by inquiring of a source base station about the terminal context.

An RRC connection re-establishment message may include information for controlling to resume a signaling radio bearer of the NB-IoT terminal. As described above, an NB-IoT terminal supporting a control plane CIoT EPS optimization may transmit or receive a little amount of data through a signaling radio bearer. Accordingly, the NB-IoT terminal may resume a signaling radio bearer, thereby minimizing a service interruption and maintaining data communication.

The receiver 630 may receive terminal capability indicating support for a control plane CIoT EPS optimization. A terminal capability may be received in an initial setup procedure for the NB-IoT terminal and the base station, and the controller 610 may check, through the terminal capability information, that the NB-IoT terminal supports mobility handling (e.g., SRB resumption) through an RRC connection re-establishment operation.

Also, according to the need, the transmitter 620 may transmit, through system information, information indicating that the relevant base station permits handling of mobility by the NB-IoT terminal. For example, the transmitter 620 may transmit, through an RRC connection re-establishment, information indicating permission of an operation of the NB-IoT terminal for resuming a signaling radio bearer (mobility handling). The NB-IoT terminal may check information indicating permission of an operation of resuming a signaling radio bearer, wherein the information is received through system information, and may transmit an RRC connection re-establishment request message to the base station 600, thereby performing a mobility handling procedure.

The above-described NB-IoT terminal may be a terminal configured to support a control plane CIoT EPS optimization. Also, the NB-IoT terminal may signify a terminal which does not configure a data radio bearer and transmits or receives data in a state where AS security is not activated. Further, the above-described base station may be a source base station or a target base station.

In addition, the controller 610 controls an overall operation of base station 600 according to an improvement in service continuity for an NB-IoT terminal required to perform the above-described present embodiments. Also, the transmitter 620 and the receiver 630 are used to transmit or receive a signal, a message, or data, which is required to perform the above-described present embodiments, with a terminal.

The standard details or standard documents mentioned in the above embodiments are omitted for the simplicity of the description of the specification, and constitute a part of the present specification. Therefore, when a part of the contents of the standard details and the standard documents is added to the present specifications or is disclosed in the claims, it should be construed as falling within the scope of the present disclosure.

Although a preferred embodiment of the present disclosure has been described for illustrative purposes, those skilled in the art will appreciate that various modifications, additions and substitutions are possible, without departing from the scope and idea of the disclosure as disclosed in the accompanying claims. Therefore, the exemplary embodiments of the present disclosure do not limit the technical idea of the present disclosure but describe the technical idea thereof, and do not limit the scope of the technical idea of the present disclosure. The scope of the present disclosure shall be construed on the basis of the accompanying claims in such a manner that all of the technical ideas included within the scope equivalent to the claims belong to the present disclosure.

The invention claimed is:

1. A method for handling mobility by a NarrowBand-Internet of Things (NB-IoT) terminal, the method comprising:
    transmitting a Radio Resource Control (RRC) connection re-establishment request message to a base station when a predetermined event occurs;
    receiving an RRC connection re-establishment message from the base station; and
    resuming a signaling radio bearer based on the RRC connection re-establishment message,
    wherein the NB-IoT terminal is configured to transmit or receive data in a state where Access Stratum (AS) security is not activated and without configuring a data radio bearer.

2. The method as claimed in claim 1, wherein the NB-IoT terminal is configured to support a control plane Cellular IoT Evolved Packet System (CIoT EPS) optimization.

3. The method as claimed in claim 1, wherein the RRC connection re-establishment request message comprises terminal identifier information set to an SAE-Temporary Mobile Subscriber Identity (S-TMSI).

4. The method as claimed in claim 1, further comprising, before the transmitting of the RRC connection re-establishment request message, at least one of:
    transmitting terminal capability information indicating support for a control plane CIoT EPS optimization; and
    receiving information indicating permission of handling of mobility by the NB-IoT terminal through system information from the base station.

5. The method as claimed in claim 1, wherein the predetermined event comprises detection of a radio link failure or a handover failure.

6. The method as claimed in claim 1, wherein each of the RRC connection re-establishment request message and the RRC connection re-establishment message comprises a message authentication code.

7. A method for handling mobility of a NarrowBand-Internet of Things (NB-IoT) terminal by a base station, the method comprising:
    receiving a Radio Resource Control (RRC) connection re-establishment request message from an NB-IoT terminal;
    checking a terminal context of the NB-IoT terminal based on the RRC connection re-establishment request message; and
    transmitting an RRC connection re-establishment message for resuming a signaling radio bearer of the NB-IoT terminal,
    wherein the NB-IoT terminal is configured to transmit or receive data in a state where Access Stratum (AS) security is not activated and without configuring a data radio bearer.

8. The method as claimed in claim 7, wherein the NB-IoT terminal is configured to support a control plane Cellular IoT Evolved Packet System (CIoT EPS) optimization.

9. The method as claimed in claim 7, wherein the RRC connection re-establishment request message comprises terminal identifier information set to an SAE-Temporary Mobile Subscriber Identity (S-TMSI).

10. A NarrowBand-Internet of Things (NB-IoT) terminal for handling mobility, the NB-IoT terminal comprising:
- a transmitter configured to transmit a Radio Resource Control (RRC) connection re-establishment request message to a base station when a predetermined event occurs;
- a receiver configured to receive an RRC connection re-establishment message from the base station; and
- a controller configured to resume a signaling radio bearer based on the RRC connection re-establishment message,
- wherein the NB-IoT terminal is configured to transmit or receive data in a state where Access Stratum (AS) security is not activated and without configuring a data radio bearer.

11. The NB-IoT terminal as claimed in claim 10, wherein the NB-IoT terminal is configured to support a control plane Cellular IoT Evolved Packet System (CIoT EPS) optimization.

12. The NB-IoT terminal as claimed in claim 10, wherein the RRC connection re-establishment request message comprises terminal identifier information set to an SAE-Temporary Mobile Subscriber Identity (S-TMSI).

13. The NB-IoT terminal as claimed in claim 10, wherein
- the transmitter is configured to further transmit terminal capability information indicating support for a control plane CIoT EPS optimization, and
- the receiver is configured to further receive information indicating permission of handling of mobility by the NB-IoT terminal through system information from the base station.

14. The NB-IoT terminal as claimed in claim 10, wherein the predetermined event comprises detection of a radio link failure or a handover failure.

15. The NB-IoT terminal as claimed in claim 10, wherein each of the RRC connection re-establishment request message and the RRC connection re-establishment message comprises a message authentication code.

* * * * *